United States Patent
Behera et al.

(10) Patent No.: US 11,748,148 B2
(45) Date of Patent: Sep. 5, 2023

(54) LOGICAL PROCESSING FOR CONTAINERS

(71) Applicant: Nicira, Inc., Palo Alto, CA (US)

(72) Inventors: Somik Behera, San Francisco, CA (US); Donghai Han, Beijing (CN); Jianjun Shen, Redwood City, CA (US); Justin Pettit, Los Altos Hills, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 17/827,925

(22) Filed: May 30, 2022

(65) Prior Publication Data
US 2022/0291943 A1    Sep. 15, 2022

Related U.S. Application Data

(63) Continuation of application No. 16/877,264, filed on May 18, 2020, now Pat. No. 11,347,537, which is a (Continued)

(51) Int. Cl.
*H04L 41/0806* (2022.01)
*G06F 9/455* (2018.01)
(Continued)

(52) U.S. Cl.
CPC ........ *G06F 9/45558* (2013.01); *G06F 9/5077* (2013.01); *H04L 12/4641* (2013.01);
(Continued)

(58) Field of Classification Search
CPC . H04L 41/0806; H04L 45/586; H04L 45/745; H04L 69/329; G06F 9/5077
(Continued)

(56) References Cited

U.S. PATENT DOCUMENTS

| | | |
|---|---|---|
| 7,555,562 B2 | 6/2009 | See et al. |
| 7,983,265 B1 | 7/2011 | Dropps |

(Continued)

FOREIGN PATENT DOCUMENTS

| | | | | |
|---|---|---|---|---|
| AU | 2012340387 A1 | * | 4/2014 | ........... G06F 15/177 |
| CA | 2722300 A1 | * | 11/2008 | ....... G06F 17/30017 |

(Continued)

OTHER PUBLICATIONS

Burtsev, Anton, et al., "Fido: Fast Inter-Virtual-Machine Communication for Enterprise Appliances," USENIX'09, Jun. 14-19, 2009, 14 pages, San Diego, California, USA.

(Continued)

*Primary Examiner* — Khanh Q Dinh
(74) *Attorney, Agent, or Firm* — ADELI LLP

(57) ABSTRACT

Some embodiments provide a local network controller that manages a first managed forwarding element (MFE) operating to forward traffic on a host machine for several logical networks and configures the first MFE to forward traffic for a set of containers operating within a container virtual machine (VM) that connects to the first MFE. The local network controller receives, from a centralized network controller, logical network configuration information for a logical network to which the set of containers logically connect. The local network controller receives, from the container VM, a mapping of a tag value used by a second MFE operating on the container VM to a logical forwarding element of the logical network to which the set of containers connect. The local network controller configures the first MFE to apply the logical network configuration information to data messages received from the container VM that are tagged with the tag value.

18 Claims, 14 Drawing Sheets

Related U.S. Application Data continuation of application No. 15/959,252, filed on Apr. 22, 2018, now Pat. No. 10,671,424, which is a continuation of application No. 14/839,754, filed on Aug. 28, 2015, now Pat. No. 9,971,624.

(60) Provisional application No. 62/162,774, filed on May 17, 2015.

(51) Int. Cl.

| | | |
|---|---|---|
| H04L 12/46 | (2006.01) | |
| H04L 45/586 | (2022.01) | |
| H04L 69/329 | (2022.01) | |
| G06F 9/50 | (2006.01) | |
| H04L 45/745 | (2022.01) | |

(52) U.S. Cl.
CPC ........ *H04L 41/0806* (2013.01); *H04L 45/586* (2013.01); *H04L 69/329* (2013.01); *G06F 2009/45583* (2013.01); *G06F 2009/45595* (2013.01); *H04L 45/745* (2013.01)

(58) Field of Classification Search
USPC .................. 709/219, 220, 224, 226, 228
See application file for complete search history.

(56) References Cited

U.S. PATENT DOCUMENTS

| | | | |
|---|---|---|---|
| 8,565,718 B1* | 10/2013 | Erman | H04W 48/06 455/414.1 |
| 8,577,845 B2 | 11/2013 | Nguyen et al. | |
| 8,725,898 B1 | 5/2014 | Vincent | |
| 8,863,129 B2 | 10/2014 | Dawson et al. | |
| 9,197,529 B2 | 11/2015 | Ganichev et al. | |
| 9,225,597 B2 | 12/2015 | Tubaltsev et al. | |
| 9,313,129 B2 | 4/2016 | Ganichev et al. | |
| 9,344,349 B2 | 5/2016 | Ganichev et al. | |
| 9,419,855 B2 | 8/2016 | Ganichev et al. | |
| 9,450,873 B2 | 9/2016 | Greenberg et al. | |
| 9,454,392 B2 | 9/2016 | Luxenberg et al. | |
| 9,503,371 B2 | 11/2016 | Thakkar et al. | |
| 9,532,004 B1* | 12/2016 | Metter | H04N 7/152 |
| 9,558,029 B2 | 1/2017 | Behera et al. | |
| 9,577,845 B2 | 2/2017 | Thakkar et al. | |
| 9,590,901 B2 | 3/2017 | Tubaltsev et al. | |
| 9,606,896 B2 | 3/2017 | Mehta et al. | |
| 9,645,835 B2 | 5/2017 | Phillips et al. | |
| 9,692,696 B2 | 6/2017 | DeCusatis et al. | |
| 9,697,033 B2 | 7/2017 | Koponen et al. | |
| 9,755,965 B1 | 9/2017 | Yadav et al. | |
| 9,781,009 B2 | 10/2017 | Mehra et al. | |
| 9,785,455 B2 | 10/2017 | Chandrashekhar et al. | |
| 9,805,595 B1* | 10/2017 | Liebinger Portela | G08G 1/012 |
| 9,819,581 B2 | 11/2017 | Chanda et al. | |
| 9,847,938 B2 | 12/2017 | Chanda et al. | |
| 9,860,151 B2 | 1/2018 | Ganichev et al. | |
| 9,860,342 B2 | 1/2018 | Hunt | |
| 9,893,988 B2 | 2/2018 | Agarwal et al. | |
| 9,898,317 B2 | 2/2018 | Nakil et al. | |
| 9,910,686 B2 | 3/2018 | Chandrashekhar et al. | |
| 9,930,010 B2 | 3/2018 | Sun et al. | |
| 9,971,624 B2* | 5/2018 | Behera | G06F 9/45558 |
| 9,992,289 B2 | 6/2018 | Nayak et al. | |
| 9,998,371 B2 | 6/2018 | Shen et al. | |
| 10,063,469 B2 | 8/2018 | Shen et al. | |
| 10,078,526 B2 | 9/2018 | Han | |
| 10,078,527 B2 | 9/2018 | Han | |
| 10,110,431 B2 | 10/2018 | Ganichev et al. | |
| 10,506,022 B2 | 12/2019 | Bansal | |
| 10,616,104 B2 | 4/2020 | Shen et al. | |
| 10,671,424 B2 | 6/2020 | Behera et al. | |
| 10,779,779 B2 | 9/2020 | Hayakawa et al. | |
| 10,871,981 B2 | 12/2020 | Han et al. | |
| 10,873,638 B2 | 12/2020 | Nayak et al. | |
| 10,880,216 B2 | 12/2020 | Jiang et al. | |
| 10,891,144 B2 | 1/2021 | Han et al. | |
| 10,897,453 B2 | 1/2021 | Hira et al. | |
| 11,206,213 B2 | 12/2021 | Shen et al. | |
| 11,347,537 B2* | 5/2022 | Behera | H04L 41/0806 |
| 11,431,781 B1* | 8/2022 | Carofiglio | H04N 21/64723 |
| 2004/0039741 A1 | 2/2004 | Benson et al. | |
| 2005/0018665 A1 | 1/2005 | Jordan et al. | |
| 2005/0022018 A1 | 1/2005 | Szor | |
| 2006/0143300 A1 | 6/2006 | See et al. | |
| 2006/0200696 A1 | 9/2006 | Shimada | |
| 2006/0293073 A1* | 12/2006 | Rengaraju | H04L 65/4038 348/E7.083 |
| 2007/0094730 A1 | 4/2007 | Bhikkaji et al. | |
| 2007/0140263 A1 | 6/2007 | Mitome et al. | |
| 2007/0204151 A1* | 8/2007 | Schnackenberg | H04L 63/105 713/161 |
| 2008/0175383 A1 | 7/2008 | Sun | |
| 2008/0222309 A1 | 9/2008 | Shanbhogue | |
| 2008/0240122 A1 | 10/2008 | Richardson et al. | |
| 2009/0044276 A1 | 2/2009 | Abdel-Aziz et al. | |
| 2009/0083445 A1 | 3/2009 | Ganga | |
| 2009/0183173 A1 | 7/2009 | Becker et al. | |
| 2009/0254990 A1 | 10/2009 | McGee et al. | |
| 2009/0260083 A1 | 10/2009 | Szeto et al. | |
| 2009/0328220 A1 | 12/2009 | Abdel-Aziz et al. | |
| 2010/0050258 A1 | 2/2010 | Talpade et al. | |
| 2010/0061245 A1 | 3/2010 | Larsen | |
| 2010/0138919 A1 | 6/2010 | Peng et al. | |
| 2010/0172453 A1 | 7/2010 | Cankaya et al. | |
| 2011/0018998 A1* | 1/2011 | Guzik | H04N 21/21 348/143 |
| 2011/0090915 A1 | 4/2011 | Droux et al. | |
| 2011/0194563 A1 | 8/2011 | Shen et al. | |
| 2012/0170585 A1 | 7/2012 | Mehra et al. | |
| 2012/0179776 A1 | 7/2012 | Umezuki | |
| 2012/0221955 A1 | 8/2012 | Raleigh et al. | |
| 2012/0304168 A1 | 11/2012 | Seeniraj et al. | |
| 2013/0003538 A1 | 1/2013 | Greenberg et al. | |
| 2013/0021933 A1* | 1/2013 | Kovvali | H04W 88/18 370/252 |
| 2013/0034094 A1 | 2/2013 | Cardona et al. | |
| 2013/0044636 A1 | 2/2013 | Koponen et al. | |
| 2013/0058335 A1 | 3/2013 | Koponen et al. | |
| 2013/0061047 A1 | 3/2013 | Sridharan et al. | |
| 2013/0125120 A1* | 5/2013 | Zhang | H04L 67/1008 718/1 |
| 2013/0125230 A1* | 5/2013 | Koponen | H04L 41/12 726/13 |
| 2013/0142048 A1 | 6/2013 | Gross, IV et al. | |
| 2013/0219078 A1 | 8/2013 | Padmanabhan et al. | |
| 2013/0263118 A1 | 10/2013 | Kannan et al. | |
| 2014/0007087 A1 | 1/2014 | Scott-Nash et al. | |
| 2014/0156818 A1 | 6/2014 | Hunt | |
| 2014/0189867 A1 | 7/2014 | Jung et al. | |
| 2014/0348161 A1 | 11/2014 | Koponen et al. | |
| 2015/0009995 A1 | 1/2015 | Gross, IV et al. | |
| 2015/0016286 A1 | 1/2015 | Ganichev et al. | |
| 2015/0016287 A1 | 1/2015 | Ganichev et al. | |
| 2015/0016469 A1 | 1/2015 | Ganichev et al. | |
| 2015/0052522 A1* | 2/2015 | Chanda | G06F 9/455 718/1 |
| 2015/0058968 A1* | 2/2015 | Wang | H04L 63/0281 726/12 |
| 2015/0063364 A1 | 3/2015 | Thakkar et al. | |
| 2015/0106815 A1 | 4/2015 | Nayak et al. | |
| 2015/0256581 A1* | 9/2015 | Kolhi | H04L 65/80 709/219 |
| 2015/0263897 A1* | 9/2015 | Ganichev | H04L 49/35 370/254 |
| 2015/0263899 A1* | 9/2015 | Tubaltsev | H04L 45/02 370/254 |
| 2015/0263946 A1 | 9/2015 | Tubaltsev et al. | |
| 2015/0263952 A1* | 9/2015 | Ganichev | H04L 45/745 370/389 |
| 2015/0271303 A1* | 9/2015 | Neginhal | H04L 41/0883 370/392 |

(56) References Cited

U.S. PATENT DOCUMENTS

| | | |
|---|---|---|
| 2015/0350813 A1* | 12/2015 | Prats .................... H04L 67/125 709/208 |
| 2015/0370586 A1 | 12/2015 | Cooper et al. |
| 2016/0048464 A1 | 2/2016 | Nakajima et al. |
| 2016/0057014 A1 | 2/2016 | Thakkar et al. |
| 2016/0092259 A1 | 3/2016 | Mehta et al. |
| 2016/0094460 A1 | 3/2016 | Shelar et al. |
| 2016/0191545 A1 | 6/2016 | Nanda et al. |
| 2016/0226960 A1 | 8/2016 | Zhang et al. |
| 2016/0226961 A1 | 8/2016 | Zhang et al. |
| 2016/0335107 A1 | 11/2016 | Behera et al. |
| 2016/0335129 A1 | 11/2016 | Behera et al. |
| 2017/0034023 A1 | 2/2017 | Nickolov et al. |
| 2017/0041435 A1 | 2/2017 | Simpson et al. |
| 2017/0093617 A1 | 3/2017 | Chanda et al. |
| 2017/0093636 A1 | 3/2017 | Chanda et al. |
| 2017/0093677 A1 | 3/2017 | Skerry et al. |
| 2017/0123832 A1 | 5/2017 | Han |
| 2017/0126431 A1 | 5/2017 | Han et al. |
| 2017/0126493 A1 | 5/2017 | Zhang et al. |
| 2017/0126559 A1 | 5/2017 | Han et al. |
| 2017/0126726 A1 | 5/2017 | Han |
| 2017/0134507 A1 | 5/2017 | Nayak et al. |
| 2017/0142011 A1 | 5/2017 | Zhang et al. |
| 2017/0142012 A1 | 5/2017 | Thakkar et al. |
| 2017/0163532 A1 | 6/2017 | Tubaltsev et al. |
| 2017/0171144 A1 | 6/2017 | Sagiraju et al. |
| 2017/0180249 A1 | 6/2017 | Shen et al. |
| 2017/0180250 A1 | 6/2017 | Shen et al. |
| 2017/0188438 A1 | 6/2017 | Vollmer et al. |
| 2017/0250912 A1 | 8/2017 | Chu et al. |
| 2017/0277557 A1 | 9/2017 | Koponen et al. |
| 2017/0295033 A1 | 10/2017 | Cherian et al. |
| 2017/0302673 A1 | 10/2017 | Makhervaks et al. |
| 2017/0339054 A1 | 11/2017 | Yadav et al. |
| 2017/0353493 A1 | 12/2017 | Bergman |
| 2017/0366446 A1 | 12/2017 | Davie et al. |
| 2018/0048702 A1 | 2/2018 | Patil et al. |
| 2018/0067951 A1 | 3/2018 | Brandwine et al. |
| 2018/0102959 A1 | 4/2018 | Ganichev et al. |
| 2018/0239631 A1 | 8/2018 | Behera et al. |
| 2018/0248961 A1 | 8/2018 | Nayak et al. |
| 2019/0014039 A1 | 1/2019 | Shen et al. |
| 2019/0238508 A1 | 8/2019 | Hira et al. |
| 2019/0238509 A1 | 8/2019 | Hira et al. |
| 2020/0228447 A1 | 7/2020 | Shen et al. |
| 2020/0278879 A1 | 9/2020 | Behera et al. |
| 2021/0132983 A1 | 5/2021 | Han |
| 2021/0166334 A1* | 6/2021 | Lee .................... G06Q 10/06 |
| 2021/0241800 A1* | 8/2021 | Patry .................... H04N 5/76 |
| 2022/0078112 A1 | 3/2022 | Shen et al. |

FOREIGN PATENT DOCUMENTS

| | | | | |
|---|---|---|---|---|
| CA | 3002975 A1 * | 10/2010 | ............ | G06F 9/455 |
| CA | 2885087 A1 * | 3/2014 | .......... | H04L 47/803 |
| CN | 101809943 A | 8/2010 | | |
| EP | 3298487 A1 | 3/2018 | | |
| WO | 2009042397 A1 | 4/2009 | | |
| WO | 2016187168 A1 | 11/2016 | | |

OTHER PUBLICATIONS

Mahalingam, M., et al., "Virtual eXtensible Local Area Network (VXLAN): A Framework for Overlaying Virtualized Layer 2 over Layer 3 Networks," RFC7348, Aug. 26, 2014, 23 pages.

PCT International Search Report and Written Opinion of Commonly Owned International Patent Application PCT/US2016/032802, dated May 10, 2016, 13 pages, International Searching Authority (EPO).

Ren, Yi, et al., "Residency-Aware Virtual Machine Communication Optimization: Design Choices and Techniques," 2013 IEEE Sixth International Conference on Cloud Computing, Jun. 28-Jul. 3, 2013, 8 pages, IEEE, Santa Clara, CA, USA.

* cited by examiner

LOGICAL PROCESSING FOR CONTAINERS

CLAIM OF BENEFIT TO PRIOR APPLICATIONS

This application is a continuation application of U.S. patent application Ser. No. 16/877,264, filed May 18, 2020, now published as U.S. Patent Publication 2020/0278879. U.S. patent application Ser. No. 16/877,264 is a continuation application of U.S. patent application Ser. No. 15/959,252, filed Apr. 22, 2018, now issued as U.S. Pat. No. 10,671,424. U.S. patent application Ser. No. 15/959,252 is a continuation application of U.S. patent application Ser. No. 14/839,754, filed Aug. 28, 2015, now issued as U.S. Pat. No. 9,971,624. U.S. patent application Ser. No. 14/839,754 claims the benefit of U.S. Provisional Patent Application 62/162,774, filed May 17, 2015. U.S. patent application Ser. No. 14/839,754, now issued as U.S. Pat. No. 9,971,624, U.S. patent application Ser. No. 15/959,252, now issued as U.S. Pat. No. 10,671,424, and of U.S. patent application Ser. No. 16/877,264, now published as U.S. Patent Publication 2020/0278879 are incorporated herein by reference.

BACKGROUND

More and more applications are deployed into virtual machines (VMs), many of which consume network and security services (e.g., firewall, access control lists (ACLs), quality of service (QoS), etc.). In virtualized networks, virtualized systems may further virtualize other systems, increasing complexity and depth in a system creating a layer of virtual interfaces behind virtual interfaces. For example, Linux containers running on a VM may create several interfaces share a single interface of the VM (also referred to as a container VM). The container interfaces that share a single interface of the container VM may make it difficult to provide a ubiquitous network virtualization platform that provides network and security services for non-container VMs as well as for containers that are executing within a container VM in the system.

BRIEF SUMMARY

Some embodiments of the invention provide a network control system for defining a logical network that connects virtual machines (VMs) that operate on host machines in a network as well as containers (e.g., Linux containers, VMs, etc.) that operate within another VM (i.e., a container VM) operating on one of the host machines of the network. The network control system of some embodiments defines logical datapaths of a logical network that logically connect the VMs on the host machines and the containers operating on container VMs. In some embodiments, the network control system includes a set of controllers that manage forwarding elements on the host machines and within the container VMs to implement the logical network.

In some embodiments, each host machine in the network includes virtualization software (e.g., a hypervisor) for virtualizing physical resources of the host machine and a host managed forwarding element (MFE) for forwarding network traffic (e.g., data messages) to and from the virtual machines. The host MFE, in some embodiments, operates within the virtualization software. In addition, some host machines include one or more VMs that connect to the host MFE, some of which may be container VMs that host a set of containers. In some embodiments, a local MFE operates within each container VM, in order to forward data messages to and from the containers hosted within the container VM.

The network control system of some embodiments includes a set of controllers for managing the host MFEs and the local MFEs. In some embodiments, the set of controllers configure the host and local MFEs to logically forward data messages of containers and VMs according to logical forwarding elements configured by an administrator of the network (e.g., logical switches, logical routers). The set of controllers of some embodiments includes a set of local VM controllers (LVCs) for managing the local MFEs of the container VMs, a set of local host controllers (LHCs) for managing the host MFEs of the host machines, and a set of centralized network controllers (CNCs) for managing the LHCs and/or LVCs to implement a logical forwarding element (LFE) of a logical network.

The different controllers may be distributed in different ways across different machines, operating on a same machine or separate machines from the element that they manage. For example, the LHC of some embodiments operates on the host machine with the host MFE (e.g., within virtualization software), while in other embodiments, the LHC operates on a machine separate from the host machine and communicates with the host MFE over a network. In some embodiments, the network control system configures the MFEs (both the host MFEs and local MFEs) in order to attach the containers of a container VM as well as non-container VMs to one or more LFEs.

In order to attach containers to a particular LFE, the LHC of some embodiments receives container information from a LVC operating on a container VM regarding the containers of the container VM. In some embodiments, the container information includes address information (e.g., MAC address, IP address) as well as application state data for applications running in the container. The container information of some embodiments identifies a mapping of local tag values (e.g., VLAN ID) to logical data (e.g., logical port, LFE, etc.) for the container.

In some embodiments, the mapping provides different local tag values for each LFE implemented by the MFE of the container VM (i.e., each LFE to which one of the containers operating in the container VM connects). In other embodiments, rather than assigning a local tag value for each LFE, the local controller assigns a different local tag value for each container on the container VM, regardless of the LFE with which the container is associated.

Based on the received container information, the LHC of some embodiments maps each container to a logical port of the particular LFE. The LHC uses the mappings of the local tag values to logical ports of LFEs to configure the host MFE to process network traffic to and from the containers and apply logical policies to the network traffic sent to and from the containers, removing the responsibility for applying such policies from the local MFEs.

For data messages sent to the containers, the host MFE tags the network traffic with local tag values based on a logical port associated with the network traffic. For example, when the host MFE receives data messages destined for a particular logical port, the host MFE determines that the particular logical port is associated with a particular local tag value based on the mapping data from the LHC, and tags the data messages with the particular local tag value before sending the data messages to the container VM. The local MFE on the container VM is configured to forward the data messages to the proper destination container based on the local tag value.

For data messages received from the containers, the local MFE (i.e., the MFE operating on the container VM) of some embodiments is configured to tag the data messages with a local tag value and forward the data message to the host MFE. The host MFE receives the data message and, based on the local tag value and/or a unique address (e.g., a source MAC address), identifies a logical port associated with the data message. The host MFE then applies a set of logical network policies (e.g., policies received from the LHC via the CNC) to the data message before forwarding the data message through the logical network. The logical network policies (e.g., firewall policies, quality of service (QoS) policies, load balancing, etc.) of some embodiments are defined at multiple levels of the logical network (e.g., logical switch port, logical switch, logical router port, etc.).

In some embodiments, rather than applying all of the logical network policies at the host MFE, the network control system distributes some of the logical processing between the host MFE and the local MFE. For example, the local MFE of some embodiments is configured to apply logical network policies that are specified for local traffic between containers on a container VM.

In some embodiments, the LHC also instantiates new containers to be added to the logical network. The LHC of some embodiments determines whether a suitable container VM is available on the host machine, and if not, creates a new container VM and initializes a local MFE for the container VM. In some embodiments, the LHC configures the local MFE to forward all traffic from the containers to the host MFE.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
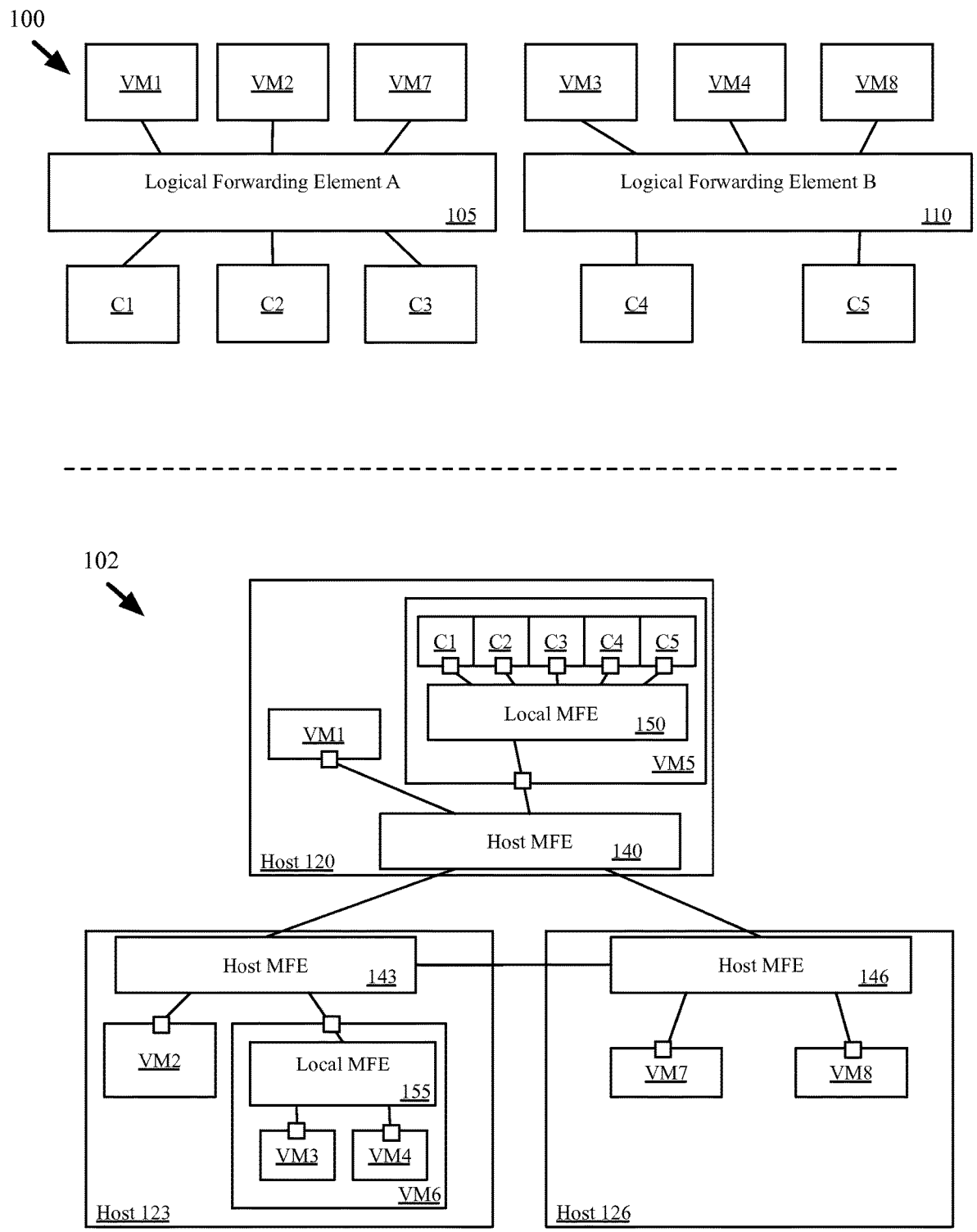
FIG. 1 illustrates an example of a logical network with containers implemented on a physical network.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

When containers run on a guest system within a container VM, a network virtualization system has to treat a container VM the same as a physical container host. All of the network forwarding and services must be done inside the container VM by the guest system. The network virtualization system installs and controls data plane, control plane, and management plane components in every container VM in order to implement virtualized network services, do L2/L3 traffic forwarding, apply policies configured to the container interfaces, and even set up tunnels (e.g. VXLAN tunnels) for the virtual networks.

In many situations, configuring the guest system to perform the network forwarding and services is inefficient and complicates the implementation of a unified networking solution for all applications in a virtual environment, since the networking solution needs to duplicate and manage the same functionalities in both the guest systems and hypervisors. Managing the services and components in both VMs and hypervisors unnecessarily complicates the network virtualization system and in some cases requires special support (e.g. support for VXLAN tunnels terminating in a container VM) of forwarding elements in the container VMs. When a large number of container VMs are deployed on a single hypervisor, the same functionalities (e.g. setting up the same VXLAN tunnels) may be duplicated in every one of these VMs and the network virtualization system is unable to leverage the optimizations in the hypervisor with hardware offloading such that more physical (compute, memory, network bandwidth, etc.) resources are unnecessarily consumed.

In order to provide a ubiquitous network virtualization platform for virtual machines (VMs) as well as containers (e.g., Linux containers, VMs, etc.) that execute within another VM, some embodiments of the invention provide a network control system for defining a logical network that connects virtual machines (VMs) that operate on host machines in a network as well as containers (e.g., Linux containers, VMs, etc.) that operate within another VM (i.e., a container VM) operating on one of the host machines of the network. The network control system of some embodiments defines logical datapaths of a logical network that logically connect the VMs on the host machines and the containers operating on container VMs. In some embodiments, the network control system includes a set of controllers that manage forwarding elements on the host machines and within the container VMs to implement the logical network.

In some embodiments, each host machine in the network includes virtualization software (e.g., a hypervisor) for virtualizing physical resources of the host machine and a host managed forwarding element (MFE) for forwarding network traffic (e.g., data messages) to and from the virtual machines. The host MFE, in some embodiments, operates within the virtualization software. In addition, some host machines include one or more VMs that connect to the host MFE, some of which may be container VMs that host a set of containers. In some embodiments, a local MFE operates within each container VM, in order to forward data messages to and from the containers hosted within the container VM.

The network control system of some embodiments includes a set of controllers for managing the host MFEs and the local MFEs. In some embodiments, the set of controllers configure the host and local MFEs to logically forward data messages of containers and VMs according to logical forwarding elements configured by an administrator of the network (e.g., logical switches, logical routers). The set of controllers of some embodiments includes a set of local VM controllers (LVCs) for managing the local MFEs of the container VMs, a set of local host controllers (LHCs) for managing the host MFEs of the host machines, and a set of centralized network controllers (CNCs) for managing the LHCs and/or LVCs to implement a logical forwarding element (LFE) of a logical network.

The different controllers may be distributed in different ways across different machines, operating on a same machine or separate machines from the element that they manage. For example, the LHC of some embodiments operates on the host machine with the host MFE (e.g., within virtualization software), while in other embodiments, the LHC operates on a machine separate from the host machine and communicates with the host MFE over a network. In some embodiments, the network control system configures the MFEs (both the host MFEs and local MFEs) in order to attach the containers of a container VM as well as non-container VMs to one or more LFEs.

In order to attach containers to a particular LFE, the LHC of some embodiments receives container information from a LVC operating on a container VM regarding the containers of the container VM. In some embodiments, the container information includes address information (e.g., MAC address, IP address) as well as application state data for applications running in the container. The container information of some embodiments identifies a mapping of local tag values (e.g., VLAN ID) to logical data (e.g., logical port, LFE, etc.) for the container.

In some embodiments, the mapping provides different local tag values for each LFE implemented by the MFE of the container VM (i.e., each LFE to which one of the containers operating in the container VM connects). In other embodiments, rather than assigning a local tag value for each LFE, the local controller assigns a different local tag value for each container on the container VM, regardless of the LFE with which the container is associated.

Based on the received container information, the LHC of some embodiments maps each container to a logical port of the particular LFE. The LHC uses the mappings of the local tag values to logical ports of LFEs to configure the host MFE to process network traffic to and from the containers and apply logical policies to the network traffic sent to and from the containers, removing the responsibility for applying such policies from the local MFEs.

For data messages sent to the containers, the host MFE tags the network traffic with local tag values based on a logical port associated with the network traffic. For example, when the host MFE receives data messages destined for a particular logical port, the host MFE determines that the particular logical port is associated with a particular local tag value based on the mapping data from the LHC, and tags the data messages with the particular local tag value before sending the data messages to the container VM. The local MFE on the container VM is configured to forward the data messages to the proper destination container based on the local tag value.

For data messages received from the containers, the local MFE (i.e., the MFE operating on the container VM) of some embodiments is configured to tag the data messages with a local tag value and forward the data message to the host MFE. The host MFE receives the data message and, based on the local tag value and/or a unique address (e.g., a source MAC address), identifies a logical port associated with the data message. The host MFE then applies a set of logical network policies (e.g., policies received from the LHC via the CNC) to the data message before forwarding the data message through the logical network. The logical network policies (e.g., firewall policies, quality of service (QoS) policies, load balancing, etc.) of some embodiments are defined at multiple levels of the logical network (e.g., logical switch port, logical switch, logical router port, etc.). It should be understood that the term data message, as used herein, may refer to various formatted collections of bits that may be sent across a network, such as Ethernet frames, IP packets, TCP segments, UDP datagrams, etc.

In some embodiments, rather than applying all of the logical network policies at the host MFE, the network control system distributes some of the logical processing between the host MFE and the local MFE. For example, the local MFE of some embodiments is configured to apply logical network policies that are specified for local traffic between containers on a container VM.

In some embodiments, the LHC also instantiates new containers to be added to the logical network. The LHC of some embodiments determines whether a suitable container VM is available on the host machine, and if not, creates a new container VM and initializes a local MFE for the container VM. In some embodiments, the LHC configures the local MFE to forward all traffic from the containers to the host MFE.

The above description introduces a system for adding containers to a logical network. Several more detailed embodiments are described below. Section I describes examples of a network control system for implementing and adding containers to a logical network. Section II describes examples of adding containers to a logical network. Section III describes examples of forwarding network traffic for containers in the network. Finally, Section IV describes an electronic system with which some embodiments of the invention are implemented.

I. Network Control System

FIG. 1 illustrates an example of logical forwarding elements that includes both VMs and containers that operate as end machines, as well as the physical implementation of this logical network. In particular, this figure conceptually illustrates two logical forwarding elements 105 and 110 with an example of a physical implementation 102 of the logical forwarding elements. These logical forwarding elements may be part of the same logical network (e.g., two logical switches connected by a logical router that is not shown in the figure) or completely different logical networks (e.g., logical networks owned by two different tenants)

The logical configuration 100 shows logical forwarding element (LFE) A 105 coupled to virtual machines VM1, VM2, and VM7, and to containers C1-C3. The logical configuration 100 also shows LFE B 110 coupled to virtual machines VM3, VM4, and VM8, and containers C4-C5. LFEs A and B of some embodiments belong to different tenants of a datacenter that houses the physical network 102. In other embodiments, LFEs A and B may be logically separate forwarding elements for a single tenant. Each LFE allows the different VMs and containers to operate as though they are all attached to a single forwarding element, regardless of the actual connections and topologies of the underlying physical network 102.

The physical implementation 102 includes three host machines 120, 123, and 126 that provide the various containers and VMs to implement the LFEs 105 and 110. The host machines 120, 123, and 126 include virtualization software (not shown) and host managed forwarding elements (MFEs) 140, 143, and 146 respectively, which in some embodiments operate within the respective hosts' virtualization software. Each of the host MFEs connects to the MFEs of the other host machines (e.g., via tunnels through a physical network infrastructure) as well as to VMs hosted on the respective host machines.

The host MFEs 140, 143, and 146 of some embodiments may include several different types of managed forwarding elements (e.g., flow-based software forwarding elements such as Open vSwitch (OVS), feature-based software forwarding elements such as VMWare™ ESX Server, etc.) that are managed in different ways (e.g., flow entries, configuration instructions, etc.). In addition, some embodiments include hardware managed forwarding elements that operate outside of the host machines, but perform the operations of the host MFE (in either a flow-based or feature-based manner). Flow entries of some embodiments are stored in forwarding tables of the MFEs to define rules for forwarding data messages (e.g., Ethernet frames, IP packets, TCP segments, UDP datagrams, etc.), through the MFE. The flow entries include a set of conditions to be matched by a data message header and a set of actions (e.g., drop, forward, modify, etc.) to perform on a data message that matches the set of conditions. The host MFEs of some embodiments also may connect to gateways (not shown) and other network elements for connecting the logical network to other external physical networks (e.g., Internet, intranets, etc.).

The host machines 120, 123, and 126 also include several VMs that operate on top of the virtualization software of their respective host machine. VMs 1 and 5 operate on host machine 120, VMs 2 and 6 operate on host machine 123, and VMs 7 and 8 operate on host machine 126. As shown, some of the VMs connect directly to both the physical and logical forwarding elements (e.g., VMs 1, 2, 7, and 8, which are end machines of the logical forwarding elements), while other VMs (e.g., VMs 5 and 6) attach to host MFEs of the physical network 102, but are not directly represented in the logical forwarding elements 105 and 110.

VMs 5 and 6 are examples of container VMs, which virtualize a set of containers (e.g., virtual machines, applications, etc.). For example, VM5 hosts containers C1-C5, which provide environments that operate on the kernel of VM5, but are otherwise isolated from each other. VM6 hosts VMs 3 and 4, which provide environments that may each operate on their own operating system virtualized within VM6. In this application, these virtualized environments will be referred to as containers, but it should be clear to one skilled in the art that containers may refer to any of a number of different types of virtualized environments. A host machine of different embodiments can host either container VMs, non-container VMs (i.e., VMs that do not virtualize containers, and typically operate as end machines of logical networks), or some combination of both.

In some embodiments, the containers are configured in the logical forwarding elements without reference to their hosting container VM. That is, the interface of a container VM does not have a counterpart in the logical network, but is rather part of the physical implementation of that container VM. Instead, the configured logical interface by which the container connects to its logical forwarding element maps to the physical (e.g., virtual) interface of the physical container to its local MFE. Each VM hosted directly on the virtualization software of its host (e.g., VM1, container VM6) has a primary interface to its host MFE (e.g., the connection of VM6 to the host MFE 143), while the containers hosted within the container VMs (e.g., VM3, C1) have secondary interfaces to the local MFEs within their container VM. In the case of container VMs 5 and 6, their primary interface also connects to ports of local MFEs 150 and 155, respectively.

The local MFEs 150 and 155 of the container VMs 5 and 6 work with the host MFEs to perform logical processing of network traffic sent to and from the containers. In different embodiments, the local MFE can be a bridge, a software virtual switch (e.g., Open vSwitch (OVS)), or another simple forwarding element that can tag and forward network data. Some embodiments distribute the logical processing between the host and local MFEs, allowing the local MFE to handle some of the processing and forwarding of data messages. Due to potential problems with isolation and security in the containers, the local MFE on the container VM may not be fully trusted in some cases. In particular, it can be difficult to secure containers running on a container VM, so it is possible that a local MFE becomes compromised. However, as security for VMs has been long established and tested, it is unlikely that a compromised container in a container VM will be able to affect other VMs on the host machine. In order to increase security in the network control system, some embodiments of the network control system consider each different VM or host as a separate security domain, such that containers belonging to only a single tenant (e.g., a single logical network) operates within a given VM.

By identifying separate security domains for each container VM, the system is able to isolate problems caused by a compromised container to the container VM and to a single tenant. In some such embodiments, the host MFE enforces all network policies for isolating different tenants, while the local MFE is used primarily to logically divide a single tenant's network (e.g., between end machines of the tenant logical network, between different logical forwarding elements of the logical network) to provide isolation for the single tenant.

One of the benefits of distributing the logical processing between the host and local MFEs is the ability to avoid hairpinning, which occurs when data messages with both source and destination containers on a local MFE are sent out to the host MFE, processed, and then sent back down to the local MFE to be sent to the destination container. Hairpinning can create additional congestion on the network between the local and host MFEs. However, distributing the logical processing between the host and local MFEs may require more powerful and configurable MFEs (e.g., MFEs that support VXLAN tunnels that would terminate in the container VM) to be installed on each of the container VMs.

In some embodiments (e.g., VEPA, VN-Tag, etc.) no traffic forwarding is performed inside a container VM, and logical processing is primarily maintained at the host MFEs. The local MFEs are only responsible for tagging all data messages from the containers with local tag values to identify a LFE for the source container and passing the data messages to the host MFE for logical processing. The local MFE of some such embodiments is a simple bridge that simply tags all network traffic from the containers and forwards it to the host MFE.

Another benefit of maintaining the logical processing in the host MFE is that it reduces redundancies and wasted resources. As processing power and the use of virtualization increases, a single host may have several container VMs, each with its own local MFE. When logical processing is performed in each of the local MFEs, the network control system of some such embodiments needs to install and control data plane, control plane, and management plane components in every container VM, consuming more physical (compute, memory, network bandwidth, etc.) resources than necessary.

Figure 2:
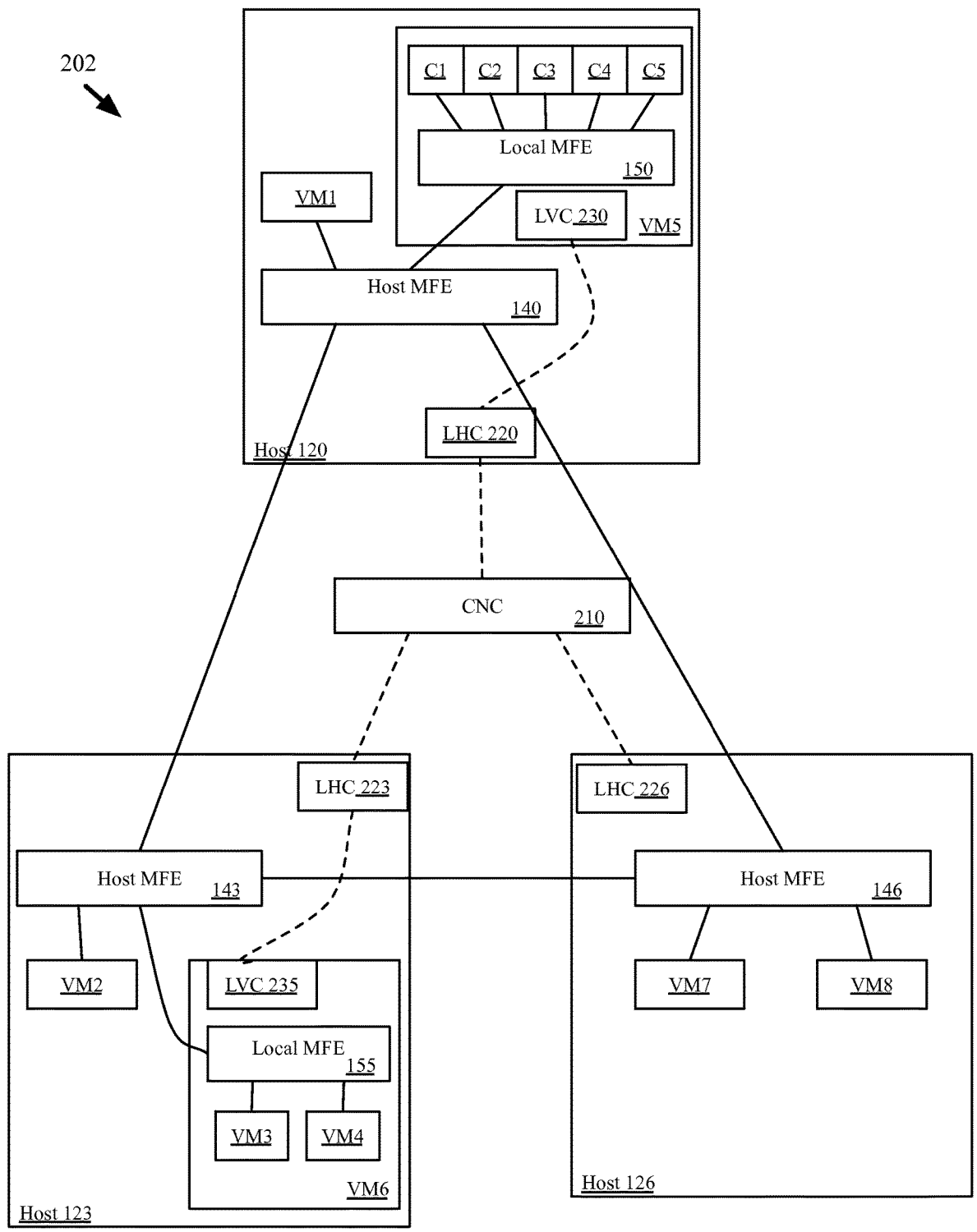
FIG. 2 illustrates an example of controllers in a logical network with containers implemented on a physical network.

As mentioned, in some embodiments a set of network controllers manage the MFEs to cause the MFEs to implement logical forwarding elements of a logical network. FIG. 2 illustrates an example of different network controllers in a network control system 202 of some embodiments. As shown, the network control system 202 manages the set of MFEs of the physical network implementation 102. This network control system 202 includes a centralized network controller (CNC) 210, local host controllers (LHCs) 220, 223, and 226, and local VM controllers (LVCs) 230 and 235.

The CNC 210 maintains high level abstractions of one or more logical networks and compute policies and forwarding tables in the high level expression. In some embodiments, the responsibilities of the CNC may be distributed over a cluster of controllers. The high level abstractions are then distributed to the local controllers (e.g., LHCs 220, 223, and 226 and LVCs 230 and 235), offloading low level data plane programming to the local controllers operating on the hosts with the managed forwarding elements. The separation of the high and low level calculations improves scalability in some embodiments by distributing complexities to the local controllers. In some embodiments, the CNC 210 manages the LHCs 220, 223, and 226 of the hosts 120, 123, and 126 to provide logical network data to the LHCs.

The LHCs 220, 223, and 226 of some embodiments manage the host MFEs 140, 143, and 146 to implement logical network policies (e.g., L2/L3 traffic forwarding, tunnel setup, ACL policies, etc.) based on the logical network data received from the CNC 210. For example, in some embodiments, the LHC or host MFE sets up tunnels (e.g., VXLAN or STT) to remote hypervisors that host VMs or containers connected to the same LFE (e.g., the tunnels connecting the host MFEs 140, 143, and 146. The LHCs 220, 223, and 226 of some embodiments also communicate with LVCs 230 and 235 of the container VMs 5 and 6 to manage the local MFEs and receive information about the containers hosted on the container VMs 5 and 6.

In some embodiments, the LVCs are a lightweight local controller that works together with the LHC to enable network virtualization for the containers in the VM. The LVCs 230 and 235 of some embodiments configure the local MFEs 150 and 155 to tag and forward data messages of the containers operating on the container VM. In some embodiments, the LVCs 230 and 235 also configure the local MFEs 150 and 155 to perform some logical processing for data messages between the containers of the container VM based on configuration data received from the LHCs 220 and 223.

The various controllers of the network control system may communicate with each other in different ways in different embodiments. In some embodiments, the CNC communicates directly with both the LHC and LBC, while in other embodiments the CNC only communicates with the LHCs, which then communicate with their local LVCs. In some embodiments the LVC communicates with the LHC using a dedicated communication interface (e.g., Virtual Machine Communication Interface (VMCI)) between the virtualization software and the container VM. Alternatively or conjunctively, the different controllers of the network control system may communicate using a control plane protocol to send control plane data messages through the MFEs or through other channels between the controllers.

The controllers may need to pass different types of information between themselves as well. For example, the LVC of some embodiments passes mapping information from a container VM to the LHC to enable the LHC to configure the host MFE to interpret the contexts in data message tags from a container on the container VM. In some embodiments, the LVC provides application runtime states (e.g., user ID, application type, etc.), or container runtime states (e.g., container interface link status, MAC, etc.) to the CNC, the LHC, or to LHCs of other host machines in order to compute the network policies (e.g. firewall rules) and forwarding tables (e.g. VXLAN MAC-VTEP mapping) that should be updated to the MFEs and other elements of the network (e.g., gateways). In some embodiments, the CNC populates the forwarding tables of the LFE on the host MFE and the forwarding tables of other host MFEs on remote hypervisors with the local container runtime state.

In the examples of FIGS. 1 and 2, each of the LHCs is for managing a software host MFE that is coupled to a set of VMs, each of which execute on a particular host. However, in some embodiments, some or all of these elements are hardware elements or software elements that execute on separate computing devices. For example, in some embodiments the LHC runs as an application on the same computing device as the host MFEs and VMs, while in other embodiments, the LHC runs on a separate computing device from the MFEs and VMs. In some embodiments, a MFE is coupled to a set of physical hosts rather than VMs, with each physical host operating on a separate computing device. The MFEs of some embodiments are dedicated hardware forwarding elements (e.g., top of rack ToR switches), or a combination of hardware and software MFEs.

II. Adding Containers to a Logical Network

Figure 3:
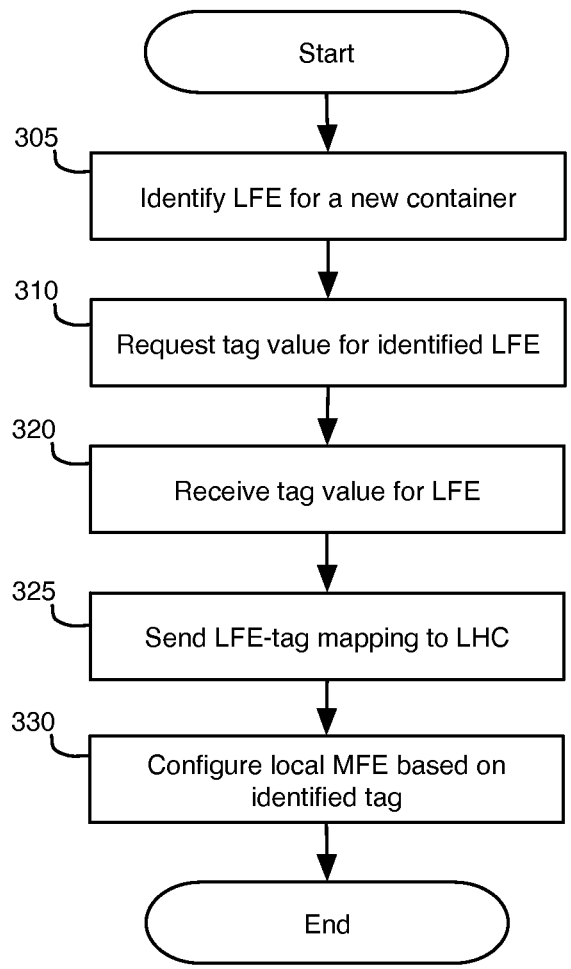
FIG. 3 conceptually illustrates a process for adding containers to a logical network at the container VM level.

As containers, configured for a logical network, are added to the physical network, the MFEs also need to be configured to handle logical network traffic to and from those containers. FIG. 3 conceptually illustrates a process of some embodiments for adding containers to a logical network at the container VM level. In some embodiments, the process 300 is performed by a LVC on a container VM that hosts a set of containers to be added to the logical network.

As shown, the process 300 begins by identifying (at 305) a LFE associated with a new container. In some embodiments, the LFE is identified based on a networking configuration received for the container from a CNC or a LHC (serving as an intermediary between the CNC and the LVC). In some embodiments, the new container is instantiated on the container VM by a separate compute controller process, or by the LVC itself. The new container may be created during the initial startup of a new logical network implemented in the physical network (e.g., a physical datacenter), or may be a new addition to an already-operating logical network in different embodiments.

The process 300 then sends (at 310) a request for a tag value for the identified LFE of the new container, and in response receives (at 320) a tag value to use for the LFE. In some embodiments, the LVC sends a request to an external tag assignment controller for a tag value for the LFE. In different embodiments, the tag assignment controller may be a separate controller that maintains a pool of available tags (e.g., VLAN tags) and assigns the tags as needed, may operate in the same machine as the CNC, or may operate on the host machine (with a separate tag assignment controller for each host machine). In some cases, the tag assignment controller maintains a separate set of tag values for each container VM; that is, different LFEs may receive different tag values on different container VMs, as the use of the tags is localized to the connection between the local MFE on the container VM and the host MFE. In addition, the same LFE may map to different tag values on different container VMs.

In some embodiments, the tag assignment controller, upon receiving a request for a tag value, determines whether the LFE is already assigned a tag value, and assigns a new tag if needed. In some embodiments, if the LVC already processes data messages for containers on the same LFE, no request is sent to the tag assignment controller. Instead, the LVC reuses the same tag value for the existing LFE.

Having identified the tag value for the LFE of the newly added container, the process 300 then sends (at 325) the mapping between the LFE and the local tag value to the LHC. In some embodiments, the LVC communicates directly with a CNC and sends the mapping to the CNC rather than, or in addition to, the LHC. The CNC and LHC use the mapping to perform logical processing and network forwarding on data messages for the containers through the network, as explained below.

Finally, the process 300 configures (at 330) the local MFE of the container VM to use the identified tag. Specifically, as shown in greater detail in the following section, the LVC configures the local MFE to (1) tag data messages received from the newly added container with the identified tag value before sending the data messages to the host MFE, and (2) distribute incoming data messages received from the host MFE with the identified tag value (and the destination address of the newly added container) to the newly added container.

Although shown as a single local MFE 150, in some embodiments, the container VM of some embodiments will include a separate bridge for each LFE of the container VM. Each bridge connects to the network interface of the container VM (or an interface bond to support load balancing over multiple MFE ports of the container VM) and to the container interfaces of the containers for the corresponding LFE. For example, in some embodiments, the LVC configures the local MFE to tag data messages by creating a bridge for each LFE of the container VM, so that network traffic for containers attached to each bridge are tagged with an appropriate tag value for the LFE. In some such embodiments, all traffic from the containers is sent to the host MFE for processing.

In some embodiments, the LVC also configures the local MFE to forward all data messages received from the containers to the host MFE for further processing. In other embodiments, the LVC configures the local MFE to handle at least a portion of the logical processing and network forwarding for network traffic that remains local to the container VM (i.e., with source and destination containers within the container VM), while forwarding all other traffic to the host MFE for processing.

Figure 4:
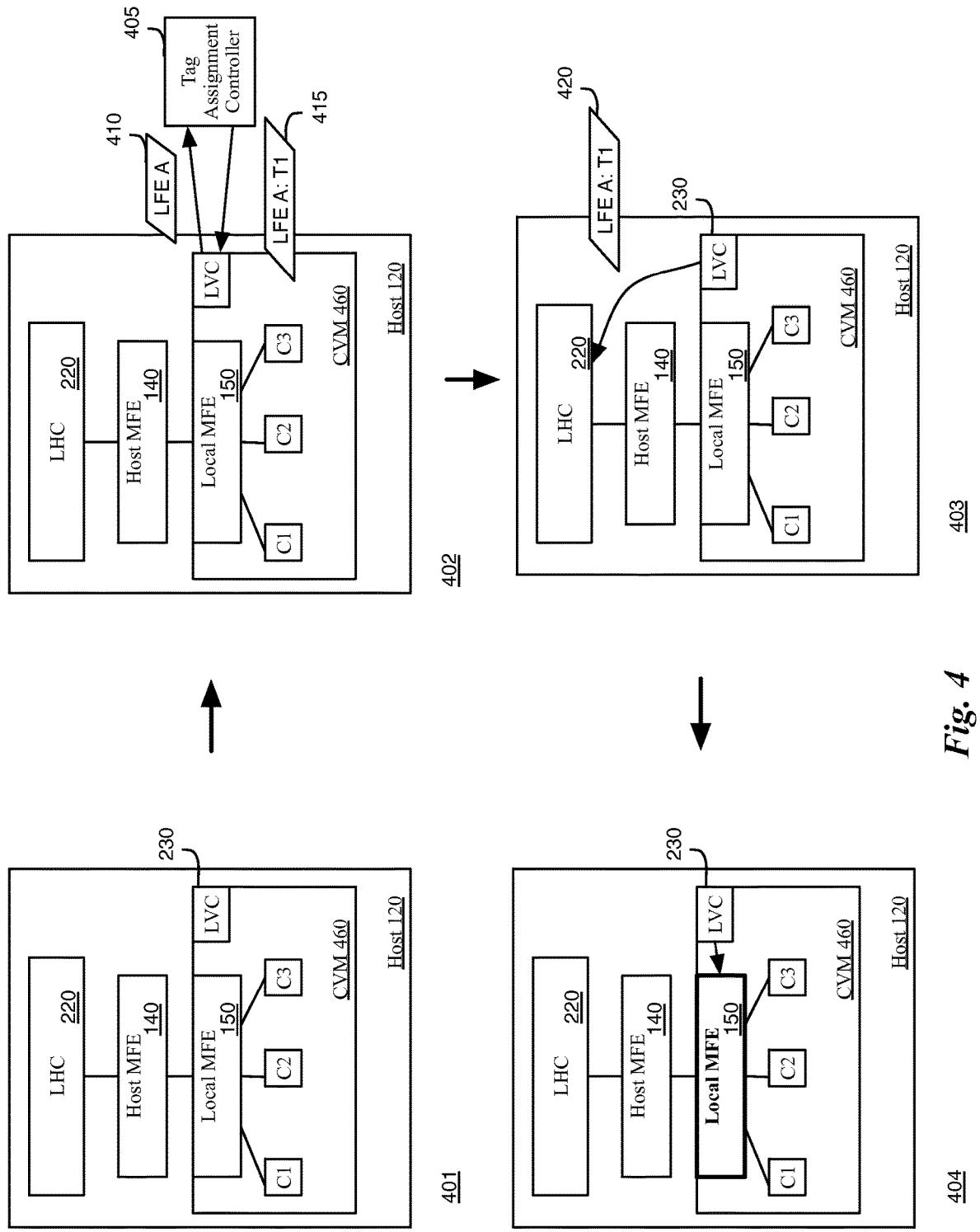
FIG. 4 illustrates an example of adding containers to a logical forwarding element of a logical network.

FIG. 4 illustrates an example of adding containers that logically connect to a first logical forwarding element to a first container VM in four stages 401-404. The first stage 401 shows host machine 120, which includes a local host controller (LHC) 220, a host MFE 140, and a container VM 460. The container VM 460 includes a local MFE 150, a local VM controller (LVC) 230, and containers C1-C3. The containers C1-C3 are newly added to the container VM 460, and connect to a LFE A of a logical network.

The second stage 402 shows that the LVC 230 sends a request 410 for a tag value to tag assignment controller 405. In some embodiments, the LVC detects the addition of the new containers C1-C3, or is notified of the new addition by either the LHC, CNC, or a compute controller. The request 410, in some embodiments, includes the LFE (LFE A) associated with the containers C1-C3 (i.e., a UUID that represents the LFE). The second stage 402 also shows that the tag assignment controller 405 responds to the request 410 with a new mapping 415, which maps the LFE A to a tag value T1.

The tag assignment controller 405 of some embodiments assigns different tag values (e.g., VLAN IDs) for each of the different LFEs operating in a container VM. In some embodiments, the tag assignment controller 405 assigns different tag values for each container, regardless of to which LFE the container connects. For example, rather than assigning a single tag (i.e., Tag 1) for all the containers C1-C3, the tag assignment module of some embodiments assigns a different tag for each container C1-C3, even though they are on the same LFE. In some such embodiments, the LVC 230 sends separate tag requests to the tag assignment controller 405 for each of the three containers C1-C3.

The tag assignment controller 405 of some embodiments is an external controller that operates on a separate machine from the host machine, while in other embodiments the tag assignment controller is a module that executes on the host machine 120, within the container VM 460. For instance, in some embodiments the tag assignment controller is a portion of the CNC or operates on the same physical machine as the CNC (or one of the CNCs in a distributed system).

The third stage 403 shows that once the LVC 230 receives the tag value T1 for LFE A, the LVC sends a mapping 420 of LFE A and Tag 1 to its LHC 220. The LHC uses the mapping 420 to configure the host MFE to perform network forwarding and logical processing for network traffic to and from the containers C1-C3. In some embodiments, the LVC also communicates other information regarding the containers (e.g., MAC address, a name (or any unique ID (e.g., UUID)) of a parent (or shared) VIF, etc.). In some embodiments, the LHC communicates the mapping and other container information to the CNC (not shown) so that the CNC can calculate a state of the logical network that incorporates the container information. The CNC then distributes logical network state data to the LHCs to manage the host MFEs on the host machines.

Finally, the fourth stage 404 shows that the LVC 230 then configures the local MFE 150 operating in its container VM. In some embodiments, the LVC receives configuration information from the LHC or CNC for configuring the local MFE to perform tagging and logical processing. The configuration of the local MFE 150, by the LVC 230, includes configuring the local MFE 150 to tag data messages received from any of the containers C1-C3 with the tag T1 before sending the data message to the host MFE 140, as well as using the tag to identify that a packet received from the host MFE 140 belongs to the LFE A.

Figure 5:
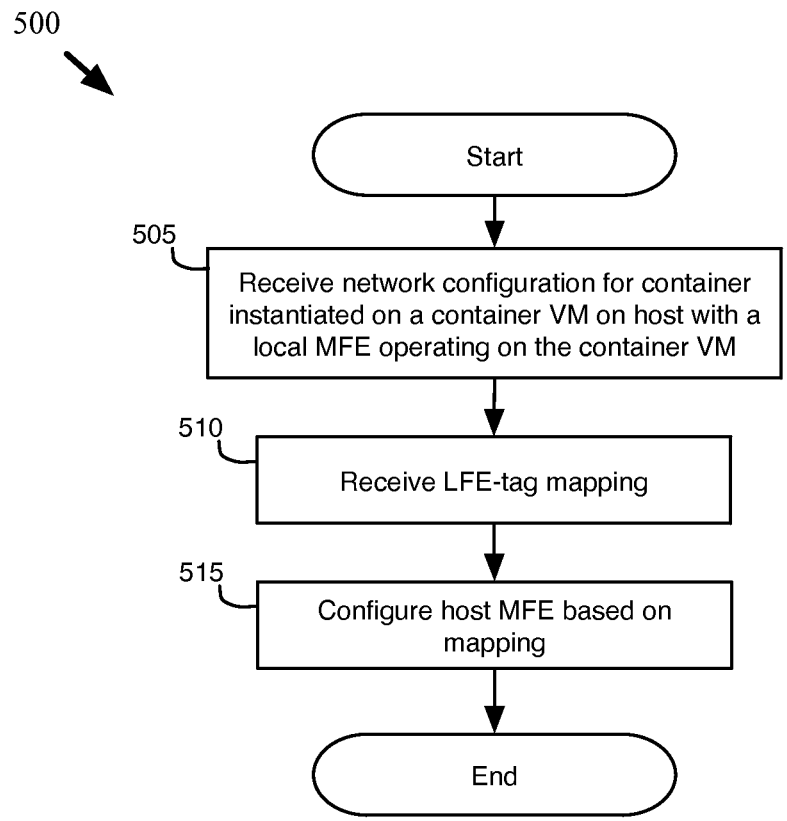
FIG. 5 conceptually illustrates a process for adding containers to a logical network at the host machine level.
Figure 6:
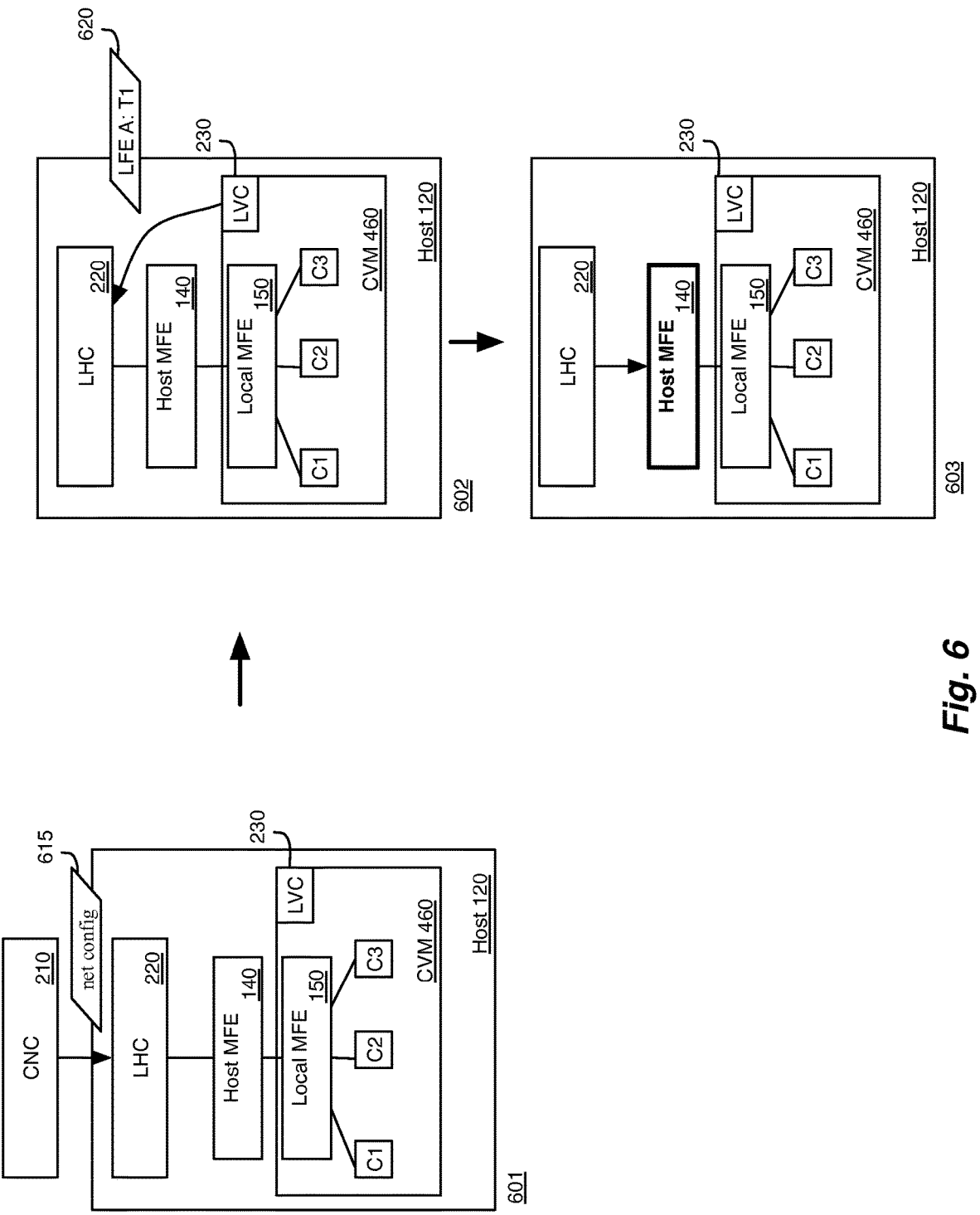
FIG. 6 illustrates an example of adding containers to a logical forwarding element of a logical network.

FIGS. 3 and 4 describe the process for adding containers from the perspective of the LVC on the container VM. FIGS. 5 and 6 subsequently illustrate these same operations from the perspective of the LHC that operates within the virtualization software of the host machine (e.g., the host machine 120 in FIG. 4).

FIG. 5 conceptually illustrates a process of some embodiments for adding containers to a logical network at the host controller level. In some embodiments, the process 500 is performed by a LHC operating on a host machine to manage a host MFE to which a container VM containing newly added containers is connected. The process 500 will be described with reference to FIG. 6, which shows an example of adding containers to a first logical forwarding element in three stages 601-603.

The process 500 begins by receiving (at 505) a network configuration for a container that has been instantiated on a particular container VM (on the local host machine) with a local MFE operating on the VM. In some embodiments, the process 500 receives the network configuration for the container from a CNC that provides logical network data to LHCs in a physical network to implement a logical network. In the first stage 601 of FIG. 6, the LHC 220 (the controller on the host machine) receives network configuration 620 for the containers C1-C3 from CNC 210. The network configuration data of some embodiments includes logical network policies (e.g., firewall, QoS, ACLS, etc.) for the containers C1-C3 in the context of a logical network, logical forwarding rules, etc.

In some embodiments, the received network configurations are the result of instructions received from a tenant in a datacenter to add new containers to the tenant's logical network. The network configurations may also result from changes in the physical network (e.g., as VMs are added and removed from the physical network) based on container information received from a LVC. The network configuration of some embodiments includes LFE information (e.g., a logical port and LFE associated with the container), and configuration information for the container. If the containers C1-C3 are the first end machines of the logical network operating on the host machine 120, the network configuration data may include all the necessary information for configuring the host MFE 140 to implement that logical network (e.g., forwarding information for the other end machines in the logical network, etc.).

Referring back to FIG. 5, the process 500 then receives (at 510) a LFE-tag mapping that associates logical elements (e.g., logical switch, logical port, LFE, etc.) of the logical network with tag values assigned to the logical element at a container VM that hosts the newly added containers. The second stage 602 of FIG. 6 illustrates the LHC 220 receiving a mapping 620 from LVC 230. The mapping 620 identifies a tag value T1 that is associated with LFE A, to which the containers C1-C3 connect. In some embodiments, the LHC receives the LFE-tag mapping for the container from the LVC that manages the local MFE of the container VM, while in other embodiments, the LHC receives the LFE-tag mapping from the CNC along with the network configuration (e.g., after the CNC receives the mapping from the LHC).

The process 500 then configures (at 515) the host MFE to perform network forwarding and other logical processing for data messages sent to and from the containers based on the received network configuration and mappings. In some embodiments, the LHC configures the host MFE by generating flow entries, based on the received network configuration and LFE-tag mapping, that are stored in forwarding tables of the host MFE to modify the forwarding behaviors of the host MFE. In other embodiments, the LHC configures the host MFE by configuring various modules of the host MFE.

More specifically, the LHC configures the host MFE to tag data messages destined for the containers with the appropriate tag value before sending the data messages to the local MFE of the container VM. The LHC also configures the host MFE to perform logical processing of data messages from the containers based on logical elements associated with the containers. The logical elements of associated with the containers are identified in some embodiments based on the LFE-tag mappings received from the LVC. This processing of data messages is described in greater detail in the below section.

The third stage 603 of FIG. 6 shows that the LHC 220 configures the host MFE 140. The LHC configures the host MFE to tag data messages destined for the containers with the appropriate tag value and to perform logical processing of data messages from the containers based on logical elements associated with the containers, as describe in the previous paragraph.

In some embodiments, the LHC 220 generates local MFE data 625 based on LFE-tag mappings and logical network information received from the LVC 230 and CNC 210 to be sent to LVC 230. The LVC 230 of some embodiments uses the local MFE data to configure the local MFE 150. In some embodiments, the generated local MFE data 625 includes a set of flow entries that the LVC 230 stores in forwarding tables of the local MFE 150 to control the forwarding behaviors of the local MFE 150.

Figure 7:
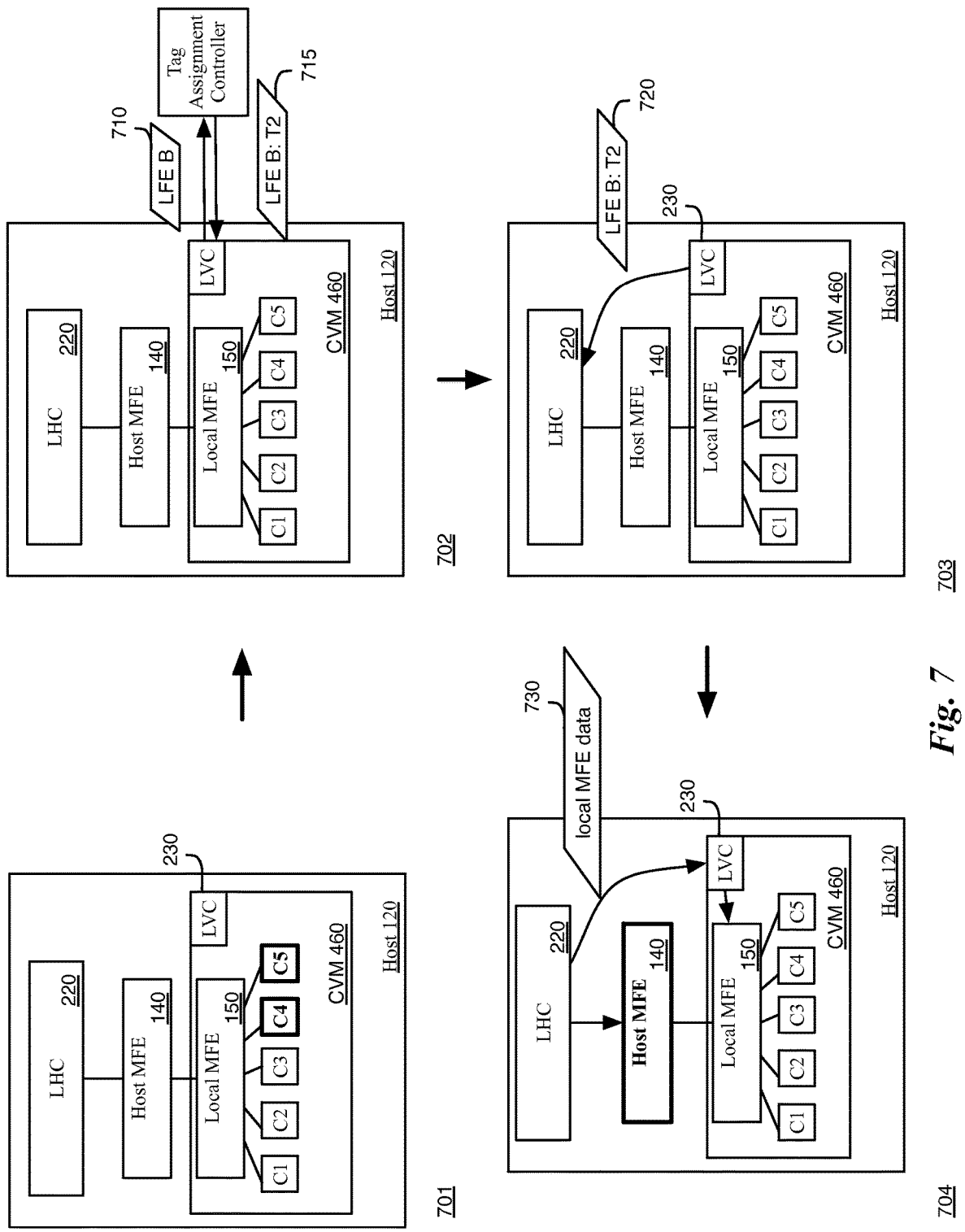
FIG. 7 illustrates an example of adding containers for a different logical forwarding element.

FIG. 7 illustrates an example of adding containers that logically connect to a second logical forwarding element to the same container VM 460 in four stages 701-704. The second logical forwarding element may be part of the same logical network as the first logical forwarding element (e.g., if all of the containers on a particular container VM are required to be part of the same logical network due to isolation concerns), or may be part of a different logical network. The first stage 701 is similar to the first stage 601 of FIG. 6 and shows a host machine 120 with LHC 220, host MFE 140, and container VM 460. The first stage 701 also shows that new containers C4 and C5 have been added to the local MFE. However, unlike containers C1-C3, which are attached to LFE A, containers C4 and C5 are attached to a different LFE B.

In the second stage 702, the LVC 230 of the container VM5 communicates with tag assignment controller 605 to learn the associated tag for the LFE of containers C4 and C5. Since containers 4 and 5 are attached to LFE B, the tag assignment controller identifies a new tag, T2, to be associated with containers C4 and C5 of LFE B. The third stage 703 shows that the LVC 230 then communicates the mapping of LFE B and tag 2, to the LHC 220. The LHC 220 (and/or CNC (not shown)) use the mapping to cause the host and local MFEs to create and implement logical network policies.

In the fourth stage 704, LHC 220 modifies the host MFE 140 and provides local MFE rules 730 to the LVC 230 based on the received mappings. The LVC 230 modifies the local MFE based on the local MFE rules 730. Once the host and local MFEs have been configured based on the LFE-tag mappings, the host MFE identifies the associated logical elements for data messages received from the container VM 460 based on the tag values, and to perform logical processing for the data messages accordingly.

In addition to adding existing containers to the logical network, the LHC of some embodiments is also responsible for instantiating the new containers in the physical network and associating the containers with logical elements of the logical network. The LHC of some of these embodiments determines whether a container VM is available on the host machine. When a container VM is not available, the LHC of some embodiments communicates with a VM generation module (e.g., Nova) to create a new container VM. The LHC of some embodiments then communicates with a container orchestration system (e.g., Docker) for creating new containers and connects the new containers to the local MFE.

In some embodiments, the LHC also communicates with a network port module (e.g., Neutron) to identify a new logical port for the container. The LHC of some embodiments sends a create port request to the network port module with the tag name, virtual interface (VIF) name (e.g., VIF UUID), and the logical forwarding element to which the container is to be added. The network port module then assigns a logical port for the logical forwarding element. Once the containers have been instantiated and associated with logical elements, the LHC adds the containers to the logical network as described above.

As described above, the LHC (or CNC) uses a mapping of logical elements (e.g., logical ports, logical forwarding elements, etc.) and tag values to modify the host and local MFEs. The host MFE uses the mappings to identify the source LFE and logical port of an ingress data message based on the associated tag value and the physical port of the host MFE on which the data message is received. In some embodiments, the host MFE uses the physical port of the host MFE and the associated tag value to identify the LFE, and uses a unique address (e.g., a MAC address) of the source container to identify the logical port within the LFE.

Figure 8:
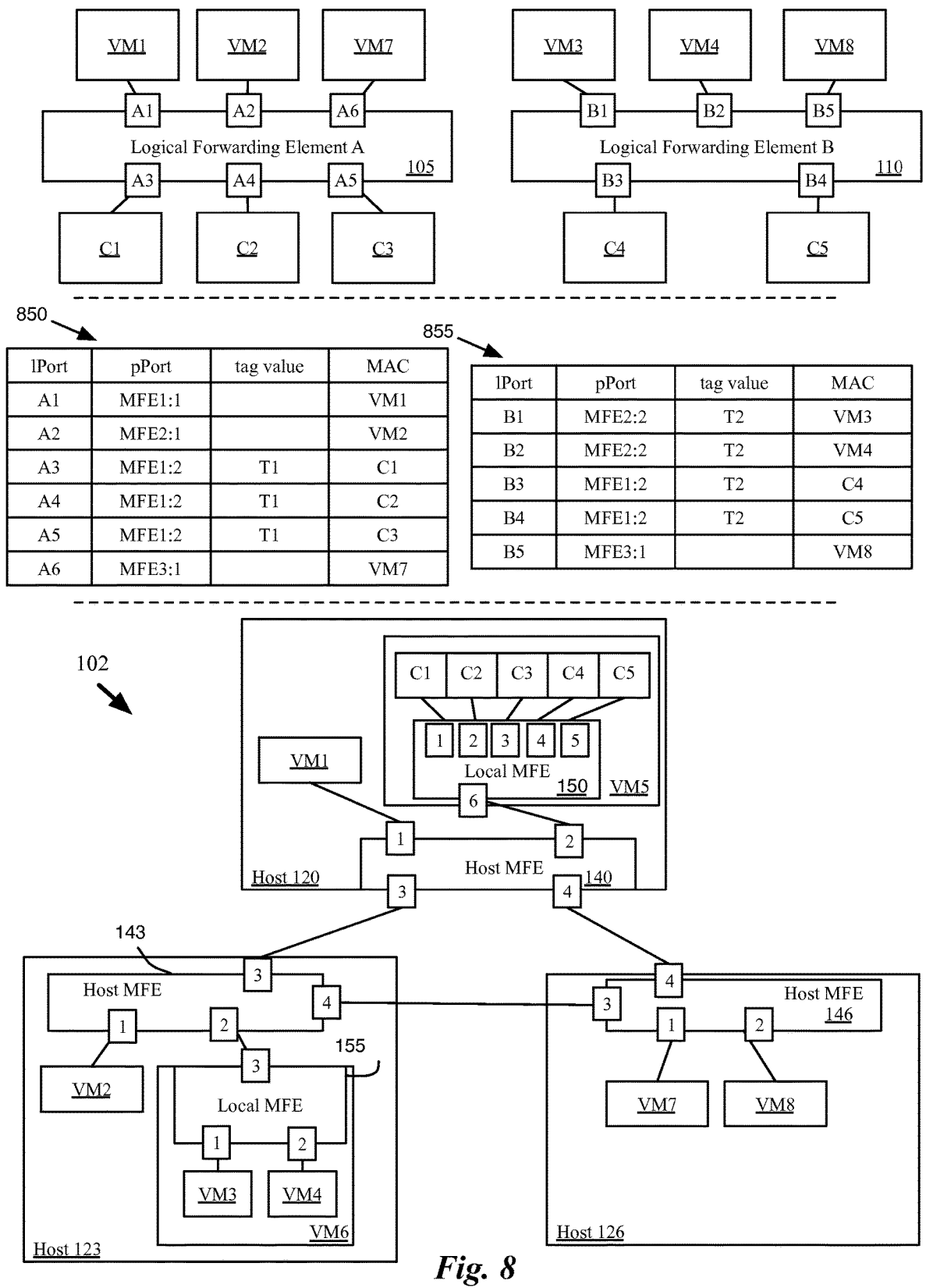
FIG. 8 illustrates an example of mappings between a logical network and a physical network.

FIG. 8 illustrates an example of mappings between logical networks and a physical network. This figure illustrates the pair of logical forwarding elements (e.g., logical switches) 105 and 110 of FIG. 1, as well as the physical network 802 implementing these two logical forwarding elements. The LFEs also show the various logical ports A1-A6 of the first LFE 105 and B1-B5 of the second LFE 110. Similarly, the representation of the physical network 802 shows physical ports (e.g., virtual NICs, tunnel ports) 1-4 for each of the host MFE 140, 143, and 143, physical ports 1-6 for the local MFE 150 on the container VM5, and physical ports 1-4 for the local MFE 155 on the container VM6. This figure also illustrates the mappings 850 and 855 between the LFEs and physical network.

Specifically, the mappings table 850 shows the mappings between the logical ports and the physical ports for LFE A. LFE A has six ports A1-A6, which connect to VM1, VM2, containers C1-C3, and VM7 respectively. The mappings table 850 shows that VM1, VM2, and VM7 connect directly to host MFEs 140, 143, and 146 through physical ports MFE1:1, MFE2:2, and MFE3:1 respectively. As these do not have local MFEs, there are no tag values associated with these VMs. Containers C1-C3, however, all connect to a local MFE 150, which connects through port 2 of host MFE 140. Traffic for each of these containers is associated with a tag value, T1.

Similarly, the mapping table 855 shows the mappings between the logical ports and the physical ports for LFE B. LFE B has five ports B1-B5, which connect to VM3, VM4, containers C4 and C5, and VM8 respectively. The mappings table 855 shows that VM8 connects directly to host MFE 146 through physical port 1 of MFE3. Containers C4 and C5, like containers C1-C3 connect to local MFE 150, which connects through port 2 to host MFE 140. However, as containers C4 and C5 are associated with LFE B, traffic for each of these containers is associated with a different tag value, T2. In addition, VM3 and VM4 are virtualized within a container VM6. VM3 and VM4 connect to local MFE 155, which connects through port 3 to host MFE 143. Like containers C4 and C5, traffic for VM3 and VM4 is associated with tag value T2. That is, in some embodiments, the same tag value is used for a particular logical forwarding element on different container VMs. In other embodiments, however, a different tag value might be used for traffic to and from VM3 and VM4 than that used for containers C4 and C5.

III. Forwarding Container Network Traffic

Once containers have been mapped to logical ports in a logical network, the CNC of some embodiments generates logical network state data for implementing the logical network through the managed forwarding elements. The local controllers (e.g., LHC and LVC) receive the logical network state data and modify the forwarding behaviors of their managed forwarding elements. At this point, the MFEs can handle logical network traffic sent to and from the containers.

Figure 9:
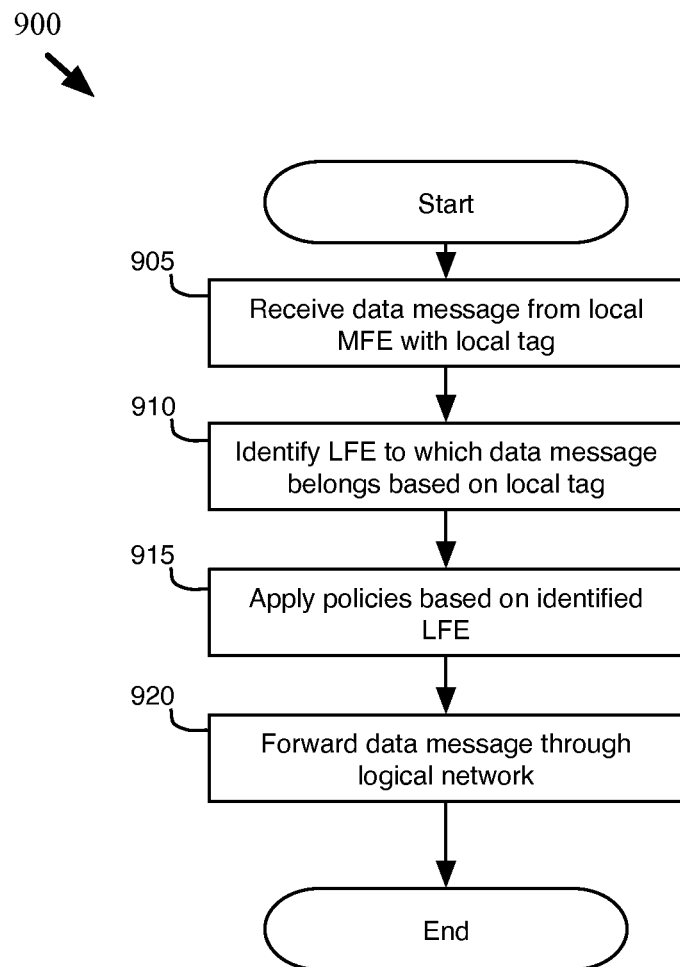
FIG. 9 conceptually illustrates a process for processing data messages from a container through a logical network.

FIG. 9 conceptually illustrates a process for forwarding network traffic sent by a container through a logical network. The process 900 of some embodiments is performed by a host MFE that has been configured by a LHC to forward container traffic according to logical network policies. The process 900 will be described with reference to FIG. 10, which illustrates an example of forwarding data messages from a container through a logical network. As shown in the first stage 1001, each of these stages illustrates a host MFE 140 that connects to a network 1050 (i.e., the physical infrastructure of a datacenter, through which tunnels are maintained between the host MFE 140 and other MFEs) and the container VM 460. The container VM 460 includes the local MFE 150 and containers C1-C5. In this example C1-C3 are attached to LFE A, while C4 and C5 are attached to LFE B (as in the examples of the previous section).

Figure 10:
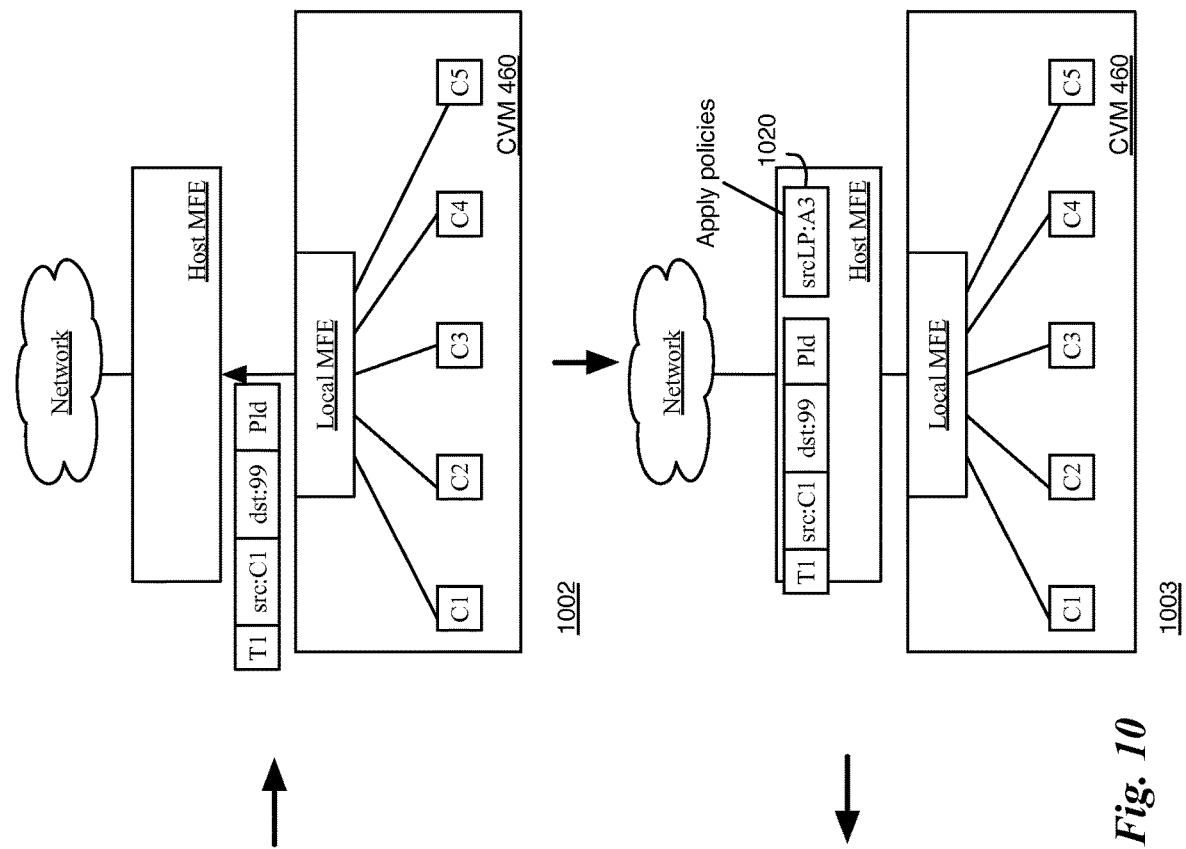
FIG. 10 illustrates an example of forwarding data messages from a container through a logical network.
Figure 10:
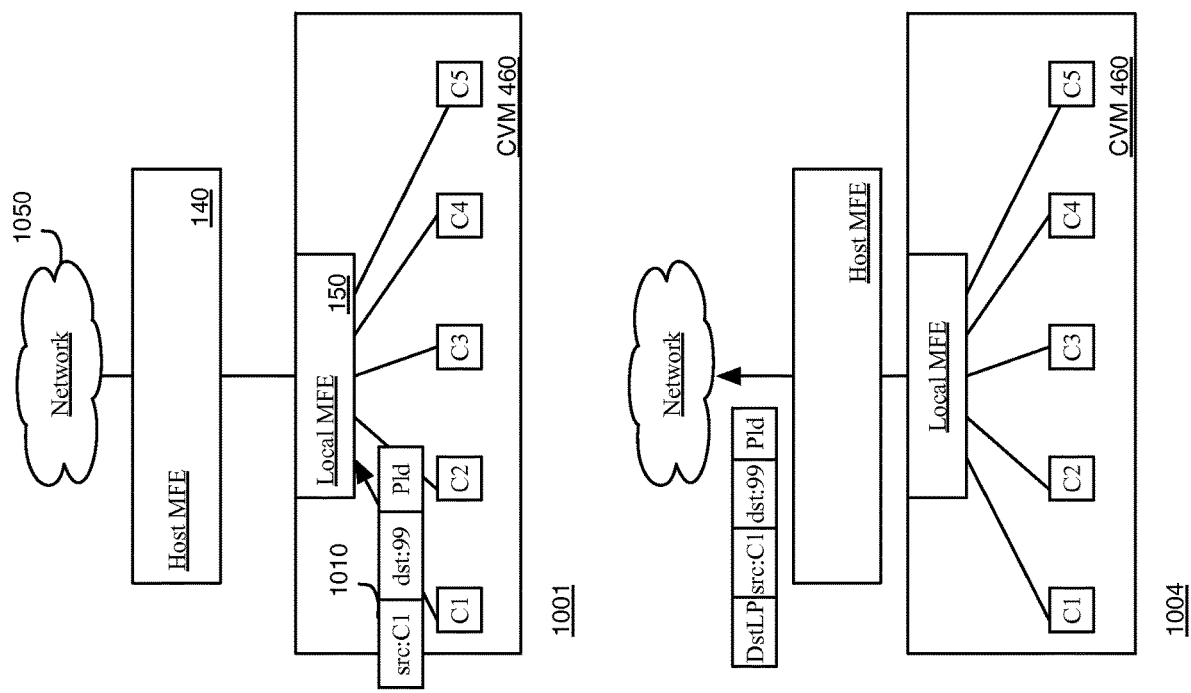

Referring back to FIG. 9, the process 900 receives (at 905) a data message from a local MFE with a local tag. The first stage 1001 of FIG. 10 illustrates that the local MFE 150 receives a data message 1010 from container C1. The data message includes a payload, destination MAC address, and a source MAC address (potentially among other header fields). The payload represents the data being sent to the destination, possibly including higher-layer (e.g., IP, TCP, application layer, etc.) headers. The source MAC address (C1) is the address for the sender container C1, while the destination MAC address (99) identifies a machine (e.g., a logical router port, another machine on the same logical switch) to which the data message 1010 is addressed. The local MFE 150 tags the data message 1010 with a local tag value T1 based on, e.g., the port of the local MFE 150 to which container C1 is attached.

The second stage 1002 shows that the local MFE 150 sends the data message, now including the tag value T1 (which may be, e.g., a VLAN tag in the layer 2 header), to the host MFE 140. The host MFE 140 receives data message 1010. The third stage 1003 shows that the host MFE 140 has received the data message 1010. In some embodiments, the host MFE 140 processes received data messages by storing information (e.g., logical ports, MAC addresses, other header data, etc.) in metadata and/or register fields of a data message object 1020.

The process 900 next identifies (at 910) a LFE to which the data message belongs, based on the local tag. In the third stage 1003, the host MFE 140 has identified the source logical port (A3) of LFE A based on the tag (T1) of the data message. In some embodiments, the host MFE identifies a LFE for a data message based on a LFE-tag mapping, and identifies a logical port for a data message based on a {LFE, ingress port, source MAC} to logical port mapping. In some embodiments, the mappings are each specific to a particular port of the MFE. For example, the host MFE identifies a logical port for a data message based on (1) the physical port of the host MFE at which the data message is received, (2) the logical forwarding element (determined based on the local tag value), and (3) the source MAC address of the data message. The host MFE 140 of some embodiments identifies the logical data based on a set of mapping tables that include various mappings between local tag values and logical entities. As shown in the third stage, the host MFE 140 stores the logical ingress port (A3) in a field of the data message object 1020. Although the data message object 1020 only shows a logical ingress port for the data message 1010, the register/metadata fields of the data message object 1020 of some embodiments stores various other information about the data message 1010 (e.g., the current stage of packet processing, intermediate logical processing context information, etc.).

After the process 900 identifies the LFE for the data message, the process 900 applies (at 915) policies based on the identified LFE, and forwards (at 920) the data message through the logical network. In some embodiments, the policies and logical forwarding performed at the host MFE 140 are generated by the LHC based on logical network data received from the CNC. In some embodiments, the logical processing is defined in terms of logical entities (e.g., logical switch port, logical switch, logical router port, etc.), so as the host MFE processes a packet through the logical network (e.g., identifying an ingress port of a LFE, then forwarding the packet to a logical egress port (which may correspond to another logical forwarding element)), the host MFE applies the appropriate logical network policies. The third stage 1003 of FIG. 10 illustrates the host MFE applying logical policies at the ingress port level based on identifying the logical ingress port A3 for the message.

In addition to logically forwarding the data message, the host MFE of some embodiments physically forwards the data message to its destination, based on the logical processing. Unless the destination is located on the same host machine, the host MFE sends the data message out to the physical infrastructure (e.g., via a tunnel). This may entail sending the data message to another host machine, or to a gateway (that connects to an external physical network outside of the physical infrastructure on which the logical network is implemented. In the fourth stage 1004, the host MFE 140 has removed the local tag and forwards the data message 1010 to the network. Instead of the local tag, the MFE has added logical context information (specifically, the logical egress port determined based on the logical processing).

Figure 11:
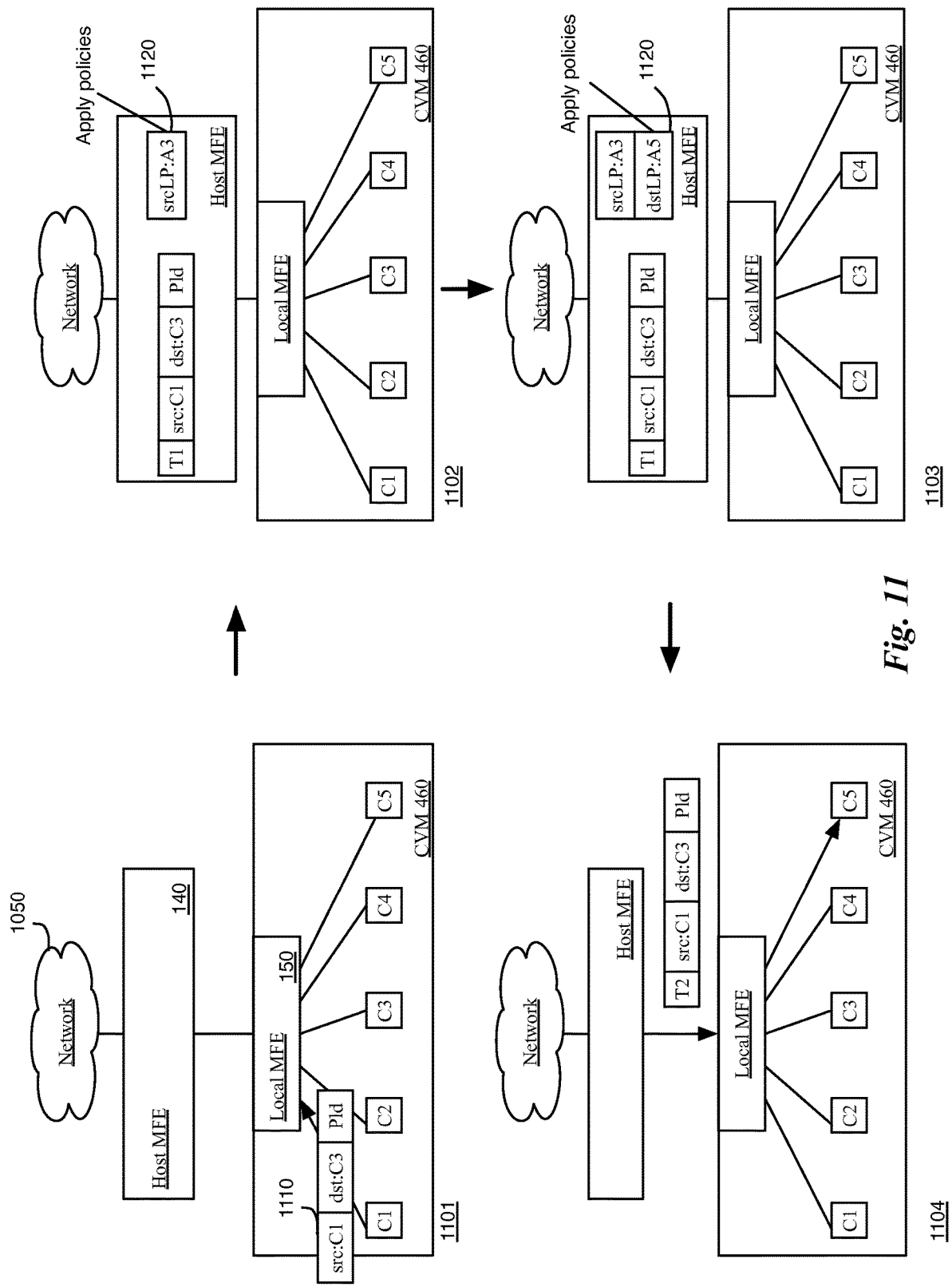
FIG. 11 illustrates another example of forwarding data messages from a container through a logical network.

In some cases, a data messages from one container is destined for another container on the same container VM. FIG. 11 illustrates example of forwarding data messages from a container through a logical network to another container on the same container VM in four stages 1101-1104. The first stage 1101 is similar to the first stage 1001 of FIG. 10, except that rather than another machine implemented outside the host, the data message 1110 is addressed to another container (C3) on the same container VM 460. In this example, the data message 1110 is still forwarded to the host MFE, even though the destination of the data message is on the container VM 460. In some other embodiments, rather than forwarding the data message to the host MFE at all, the network control system distributes portions of the logical processing to the local MFEs of the container VMs so that the local MFE can forward all local traffic between the containers of each container VM.

The second stage 1102 shows that the host MFE 140 has received a tagged data message (tagged with T1 for LFE A) and stored data message information (source logical port A3) for the data message 1110 in the data message object 1120. The host MFE 140 identifies the logical ingress port (A3) based on the port through which the data message was received, the local tag attached the data message, and the source MAC address of the data message. The second stage also shows that the host MFE 140 performs logical processing (e.g., logical forwarding) and applies policies for the data message 1110.

The third stage 1103 illustrates that the host MFE has identified the logical egress port (A5) for the data message by performing logical forwarding on the data message. That is, the destination MAC address C3 maps to the logical port A5, to which the data message is logically forwarded. As such, at the third stage 1103, the host MFE 140 applies egress policies to the data message based on this logical port information.

The fourth stage 1104 shows that the host MFE 140 has re-tagged the data message 1110 with the tag value T1, as the logical egress port A5 is also on this same logical forwarding element. If, on the other hand, the data message was processed through a logical router to another logical forwarding element (e.g., LFE B), then the data message would be tagged with a different tag value. As the destination container is on the container VM 460, the host MFE 140 sends the data message 1110 back down to the local MFE 150. The local MFE 150 then identifies the container to which to forward the data message 1110 based on the tag T2 and the destination MAC, and delivers the data message to the appropriate container C3. The logical processing and forwarding of data messages down to the containers will be described in greater detail with reference to FIGS. 12 and 13.

Figure 12:
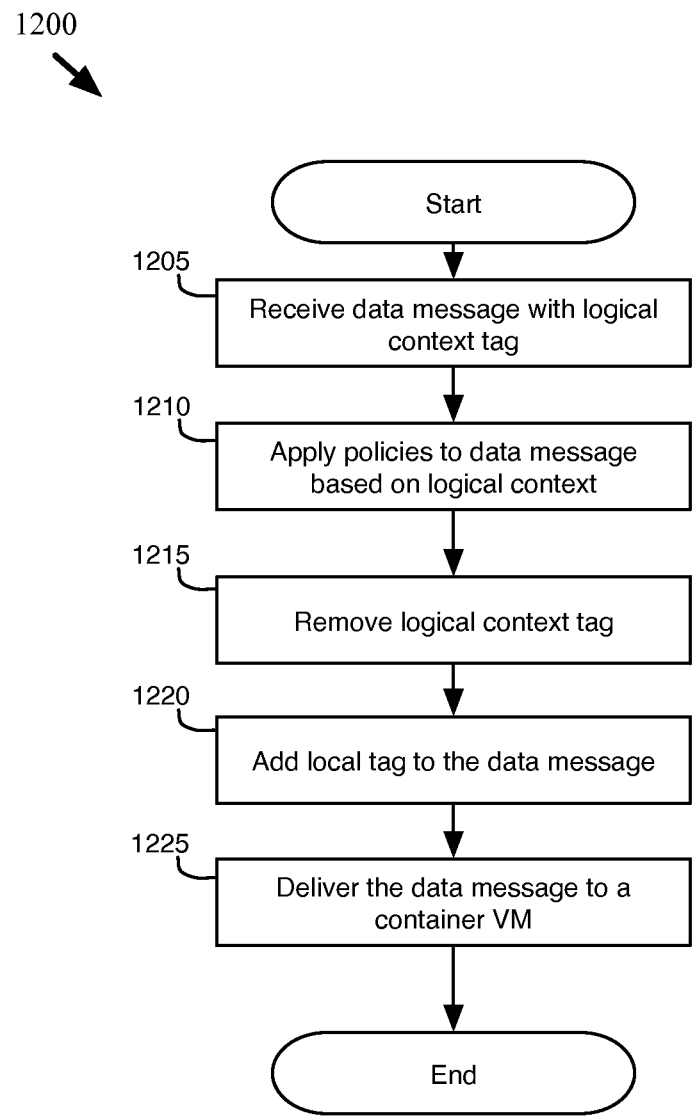
FIG. 12 conceptually illustrates a process for processing data messages destined for a container through a logical network.

FIG. 12 conceptually illustrates a process 1200 of some embodiments for performing logical processing of data messages destined for a container. The process 1200 of some embodiments is performed by a host MFE of a host machine with containers that operate on a container VM. The process 1200 will be described with reference to FIG. 13, which illustrates an example of a data message received at a host and addressed to a container operating on that host.

Figure 13:
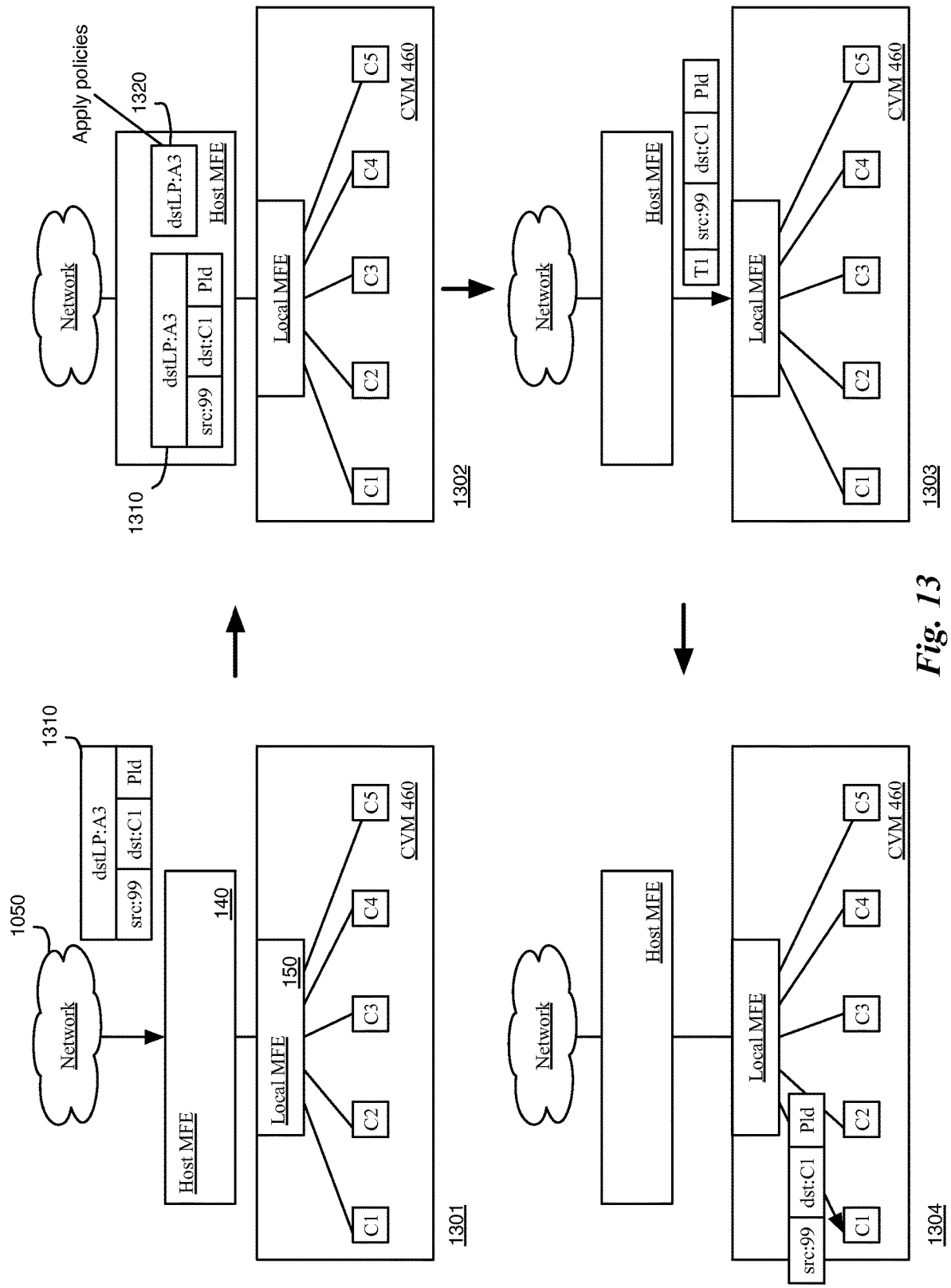
FIG. 13 illustrates an example of receiving data messages for a container through a logical network.

As shown, the process 1200 begins by receiving (at 1205) a data message with a logical context tag. In some embodiments, this logical context tag identifies a logical egress port (of a logical forwarding element) that corresponds to a container operating on a container VM that connects to the host MFE. This logical egress port, in some embodiments, would have been determined by the first host MFE to process the data message (e.g., the host MFE in FIG. 10). The first stage 1301 of FIG. 13 shows that host MFE 140 receives a data message 1310 from its connection to the physical infrastructure 1050 (e.g., from a gateway or another host MFE via a tunnel). Data message 1310 includes a payload (PLD), source and destination MAC addresses. In addition, the data message includes logical context data, which specifies the logical egress port determined by the first-hop MFE (not counting a local MFE if the packet originated from a container).

The process 1200 applies (at 1210) policies to the data message based on logical context stored in the data message. The second stage 1302 of FIG. 13 shows that the host MFE 140 has received data message 1310 with logical context information and stored some of the logical context information (i.e., the destination logical port A3) in a data message object 1320 created for use during processing of the data message. The second stage also shows that the host MFE 140 performs logical processing and applies policies for the data message 1310. In this case, logical processing primarily entails identifying that the specified logical egress port maps to a physical port of the host MFE, that connects to the local MFE.

The process 1200 removes (at 1215) the logical context tag from the data message, thereby removing all of the logical network information from the data message. This allows the logical network to be transparent to the local MFE and the container receiving the packet.

The process 1200 also adds (at 1220) a local tag to the data message. The host MFE of some embodiments identifies the local tag based on the logical context stored in the data message object 1320 (for instance, by mapping the logical forwarding element to which the logical egress port belongs to a particular local tag). Finally the process 1200 delivers (at 1225) the data message to a container VM. In some embodiments, a local MFE on the container VM then forwards the data message to the destination container.

The third stage 1303 of FIG. 13 shows that host MFE 140 has removed the logical context from the packet and added a local tag T1 (which maps to the LFE A to which the logical egress port belongs) before sending the packet to the local MFE 150 on the container VM 460. In the fourth stage 1304, the local MFE 150 receives the data message 1310, removes the local tag T1, and forwards the packet to the destination container C1 based on the local tag T1 and the destination MAC address C1.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
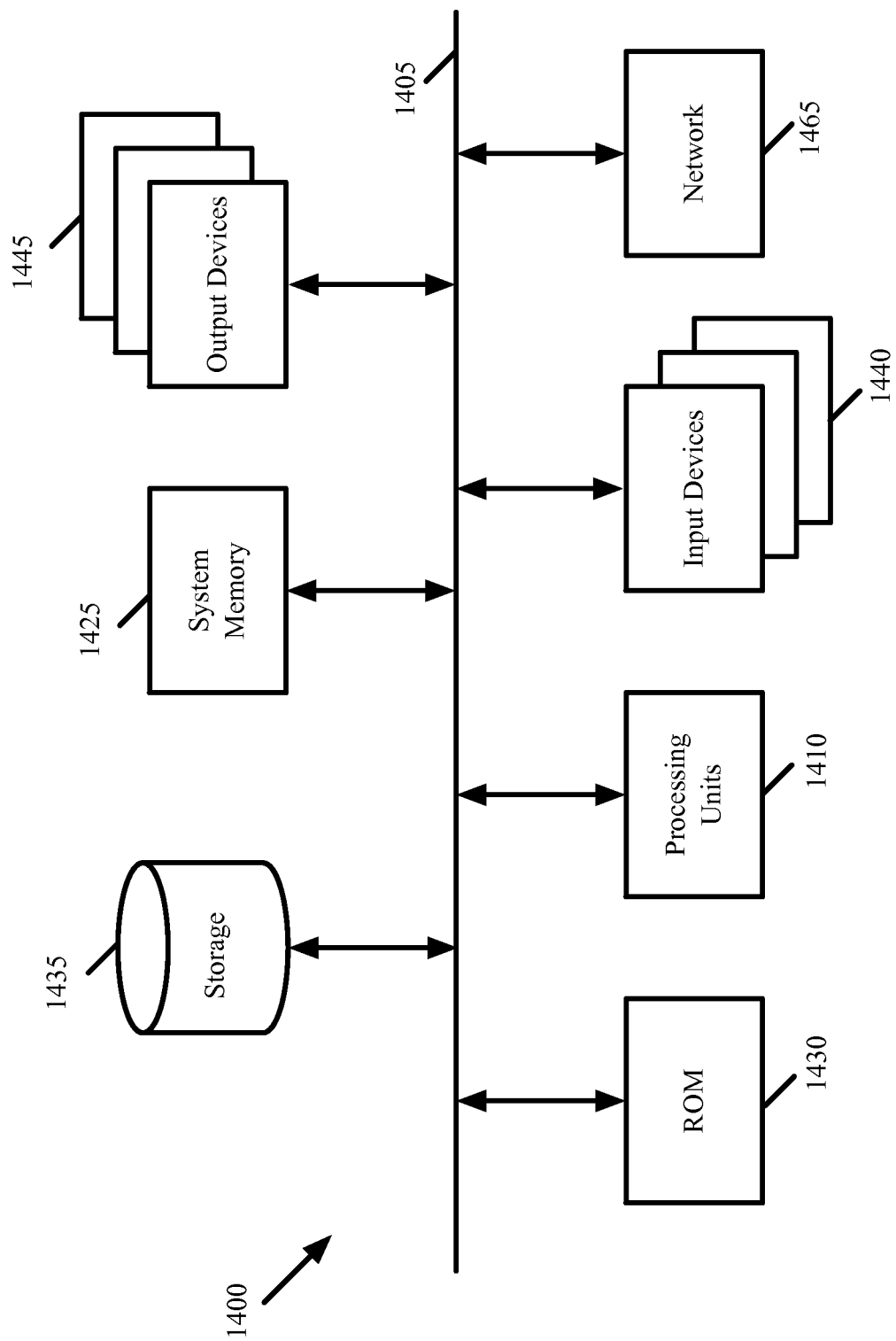
FIG. 14 conceptually illustrates a computer system with which some embodiments of the invention are implemented.

FIG. 14 conceptually illustrates a computer system 1400 with which some embodiments of the invention are implemented. The computer system 1400 can be used to implement any of the above-described hosts, controllers, and managers. As such, it can be used to execute any of the above described processes. This computer system includes various types of non-transitory machine readable media and interfaces for various other types of machine readable media. Computer system 1400 includes a bus 1405, processing unit(s) 1410, a system memory 1425, a read-only memory 1430, a permanent storage machine 1435, input machines 1440, and output machines 1445.

The bus 1405 collectively represents all system, peripheral, and chipset buses that communicatively connect the numerous internal machines of the computer system 1400. For instance, the bus 1405 communicatively connects the processing unit(s) 1410 with the read-only memory 1430, the system memory 1425, and the permanent storage machine 1435.

From these various memory units, the processing unit(s) 1410 retrieve instructions to execute and data to process in order to execute the processes of the invention. The processing unit(s) may be a single processor or a multi-core processor in different embodiments. The read-only-memory (ROM) 1430 stores static data and instructions that are needed by the processing unit(s) 1410 and other modules of the computer system. The permanent storage machine 1435, on the other hand, is a read-and-write memory machine. This machine is a non-volatile memory unit that stores instructions and data even when the computer system 1400 is off. Some embodiments of the invention use a mass-storage machine (such as a magnetic or optical disk and its corresponding disk drive) as the permanent storage machine 1435.

Other embodiments use a removable storage machine (such as a floppy disk, flash drive, etc.) as the permanent storage machine. Like the permanent storage machine 1435, the system memory 1425 is a read-and-write memory machine. However, unlike storage machine 1435, the system memory is a volatile read-and-write memory, such a random access memory. The system memory stores some of the instructions and data that the processor needs at runtime. In some embodiments, the invention's processes are stored in the system memory 1425, the permanent storage machine 1435, and/or the read-only memory 1430. From these various memory units, the processing unit(s) 1410 retrieve instructions to execute and data to process in order to execute the processes of some embodiments.

The bus 1405 also connects to the input and output machines 1440 and 1445. The input machines enable the user to communicate information and select commands to the computer system. The input machines 1440 include alphanumeric keyboards and pointing machines (also called "cursor control machines"). The output machines 1445 display images generated by the computer system. The output machines include printers and display machines, such as cathode ray tubes (CRT) or liquid crystal displays (LCD). Some embodiments include machines such as a touchscreen that function as both input and output machines.

Finally, as shown in FIG. 14, bus 1405 also couples computer system 1400 to a network 1465 through a network adapter (not shown). In this manner, the computer can be a part of a network of computers (such as a local area network ("LAN"), a wide area network ("WAN"), or an Intranet, or a network of networks, such as the Internet. Any or all components of computer system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological machines. These terms exclude people or groups of people. For the purposes of the specification, the terms display or displaying means displaying on an electronic machine. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, this specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

A number of the figures (e.g., FIGS. 3, 5, 9, and 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. In view of the foregoing, one of ordinary skill in the art would understand that the invention is not to be limited by the foregoing illustrative details, but rather is to be defined by the appended claims.

We claim:

1. A method of configuring a first managed forwarding element (MFE) that operates on a virtual machine (VM) executing on a host computer to process packets from a set of containers operating on the VM, the method comprising:
   at a first network controller executing on the VM:
   identifying a logical forwarding element (LFE) to which the set of containers logically connect;
   receiving a tag value that maps to the LFE; and
   configuring the first MFE operating on the VM to associate data messages received from the containers operating on the VM along with the first MFE with the tag value before sending the data messages to a second MFE that executes on the host computer outside of the VM and that uses the tag value to perform logical processing associated with the LFE;
   wherein a second network controller operates outside of the VM on the host computer.

2. The method of claim 1, wherein identifying the LFE comprises receiving configuration information that identifies the LFE from the second network controller.

3. The method of claim 1, wherein identifying the LFE comprises receiving configuration information that identifies the LFE from a third network controller that operates outside of the host computer and manages a plurality of host computers.

4. The method of claim 1, further comprising sending a mapping of the local tag value and the LFE to the second network controller.

5. The method of claim 4 further comprising sending a set of container information to the second network controller.

6. The method of claim 5, wherein the set of container information comprises application context data for a set of applications executing on the set of containers.

7. The method of claim 1, wherein receiving the tag value comprises:
   sending a request to a tag assignment controller; and
   receiving a response comprising the tag value.

8. The method of claim 7, wherein the tag assignment controller maintains a pool of available tag values specified for the VM.

9. A method for managing a first managed forwarding element (MFE) executing on a host computer to forward traffic for a set of containers operating on a virtual machine (VM) executing on the host computer, the method comprising:

- from a centralized network controller, receiving logical network configuration information for a logical network to which the set of containers logically connect;
- from the VM, receiving a mapping that associates a tag value, which is used by a second MFE operating on the VM, with a logical forwarding element (LFE) of the logical network to which the set of containers connect; and
- configuring the first MFE to associate data messages received from the VM that are tagged with the tag value with the LFE and to perform logical forwarding operations on data messages associated with the LFE.

10. The method of claim 9, wherein the tag value is a VLAN tag associated with the LFE.

11. The method of claim 9, wherein the logical network is a first logical network, the set of containers is a first set of containers, the LFE is a first LFE, and the tag value is a first tag value, wherein the method further comprises:

- receiving logical network configuration information for a second logical network to which a second set of containers operating on the VM logically connect;
- receiving a mapping that associates a second tag, which is value used by the second MFE, with a second LFE of the second logical network to which the second set of containers connect; and
- configuring the first MFE to associate data messages received from the VM that are tagged with the second tag value the second LFE and to perform logical forwarding operations on data messages associated with the second LFE.

12. The method of claim 9, wherein the centralized network controller is a first network controller, wherein the method further comprises sending configuration information to a second network controller for managing the second MFE, the configuration information for configuring the second MFE to apply a portion of the logical network configuration information.

13. The method of claim 12, wherein the portion of the logical configuration information relates to forwarding data messages between the containers on the VM.

14. The method of claim 9, wherein the logical configuration information is for applying at least one of firewall policies, quality of service (QoS) policies, and load balancing policies.

15. The method of claim 9, wherein receiving the mapping comprises receiving a media access control (MAC) address for each container of the set of containers.

16. The method of claim 9, wherein the set of containers operating within the VM comprises a set of virtual machines.

17. The method of claim 9, wherein the data messages comprise at least one of an Ethernet frame, an IP packet, a TCP segment, and a UDP datagram.

18. The method of claim 9, wherein the containers are for isolating services operating within each container.

* * * * *